(12) United States Patent
Okuno et al.

(10) Patent No.: US 7,116,872 B2
(45) Date of Patent: Oct. 3, 2006

(54) OPTICAL FIBER TAPE CORE

(75) Inventors: Kaoru Okuno, Yokohama (JP); Tomoyuki Hattori, Yokohama (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 10/515,767

(22) PCT Filed: May 28, 2003

(86) PCT No.: PCT/JP03/06701

§ 371 (c)(1),
(2), (4) Date: Nov. 24, 2004

(87) PCT Pub. No.: WO03/100495

PCT Pub. Date: Dec. 4, 2003

(65) Prior Publication Data

US 2005/0226573 A1   Oct. 13, 2005

(30) Foreign Application Priority Data

May 28, 2002 (JP) ............................. 2002-154148
May 28, 2002 (JP) ............................. 2002-154161

(51) Int. Cl.
*G02B 6/44* (2006.01)
*G02B 6/036* (2006.01)

(52) U.S. Cl. ...................... 385/114; 385/128
(58) Field of Classification Search .............. None
See application file for complete search history.

(56) References Cited

U.S. PATENT DOCUMENTS

| | | | | |
|---|---|---|---|---|
| 4,838,643 A * | 6/1989 | Hodges et al. | ............... | 385/127 |
| 4,848,868 A | 7/1989 | Rohner | | |
| 5,276,759 A | 1/1994 | Nguyen et al. | | |
| 5,358,011 A * | 10/1994 | Stockton et al. | ............. | 138/103 |
| 6,180,741 B1 * | 1/2001 | Yamaguchi et al. | ......... | 526/301 |
| 6,269,210 B1 * | 7/2001 | Yagi et al. | ................... | 385/114 |
| 2004/0213531 A1 * | 10/2004 | Sasaoka | ...................... | 385/123 |

FOREIGN PATENT DOCUMENTS

| | | |
|---|---|---|
| GB | 2 187 865 A | 9/1987 |
| JP | 53-110540 | 9/1978 |
| JP | S59-55076 | 4/1984 |
| JP | 59-228204 | 12/1984 |
| JP | S61-185008 | 11/1986 |
| JP | 63-013008 | 1/1988 |
| JP | 01-138514 | 5/1989 |
| JP | 02-211412 | 8/1990 |

(Continued)

*Primary Examiner*—Rodney Bovernick
*Assistant Examiner*—Omar Rojas
(74) *Attorney, Agent, or Firm*—McDermott Will & Emery LLP

(57) ABSTRACT

In an optical fiber ribbon 1 according to the present invention, four optical fibers 10, 20, 30 and 40 are arranged in parallel to each other in a plane, a part of the periphery of these four optical fibers is covered with a ribbon matrix 51, but no rest thereof is covered with the ribbon matrix. First areas covered with the ribbon matrix 51 and second areas uncovered with the ribbon matrix alternate with each other along the longitudinal direction thereof. Alternatively, the optical fiber ribbon 1 is covered with the ribbon matrix over its entire length. In the glass section of each optical fibers, the mode field diameter defined by the definition of Petermann-I at a wavelength of 1.55 μm is 8 μm or less, and the cable cutoff wavelength is 1.26 μm or less.

14 Claims, 15 Drawing Sheets

FOREIGN PATENT DOCUMENTS

| | | |
|---|---|---|
| JP | H04-75304 | 7/1992 |
| JP | 05-019144 | 1/1993 |
| JP | 06-067071 | 3/1994 |
| JP | 08-327862 | 12/1996 |
| JP | 08-327863 | 12/1996 |
| JP | 08-334661 | 12/1996 |
| JP | 08-334662 | 12/1996 |
| JP | 09-243885 | 9/1997 |
| JP | 11-218622 | 8/1999 |
| JP | 2002-62451 | 2/2002 |
| WO | WO 95/09376 | 4/1995 |

* cited by examiner

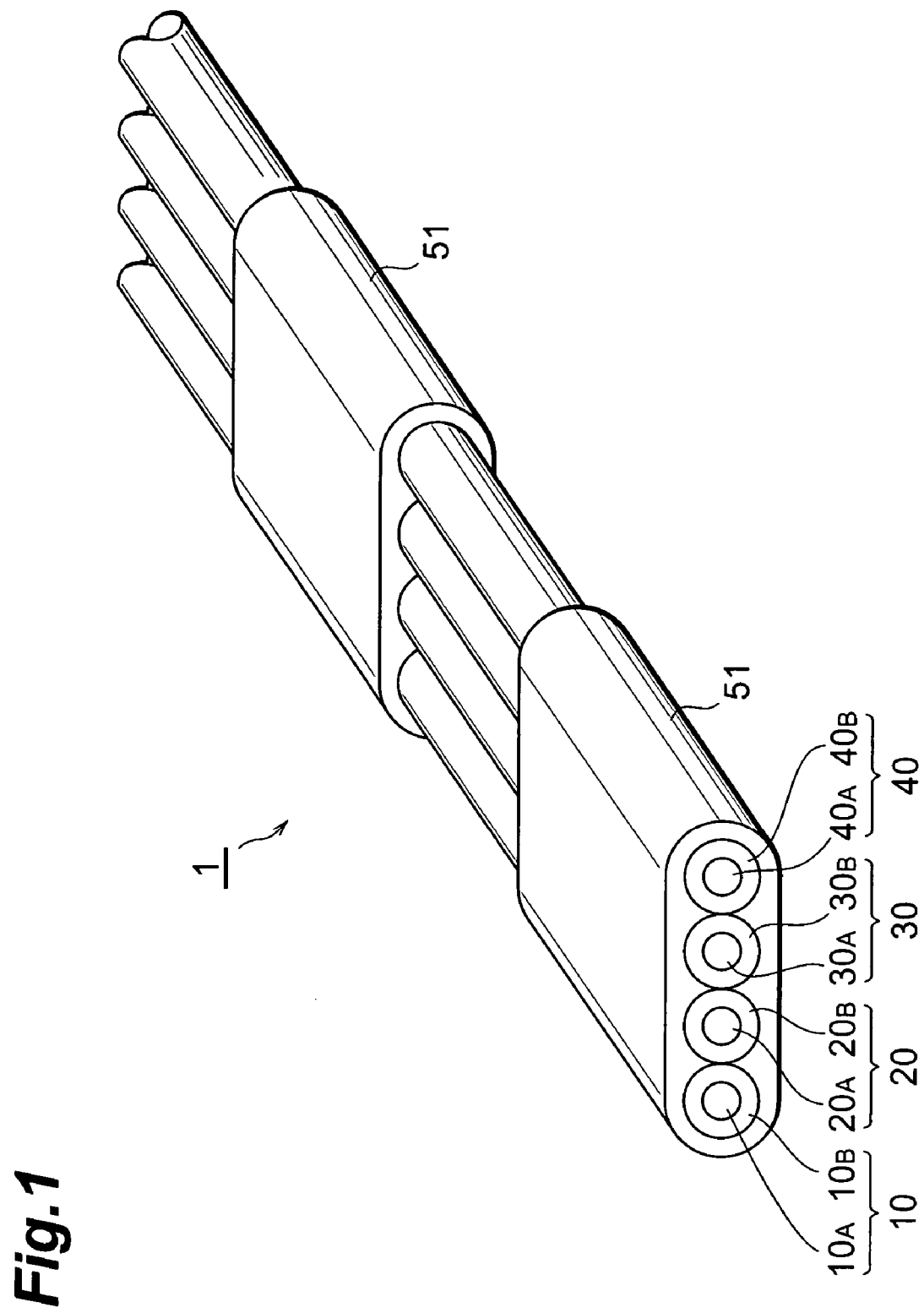

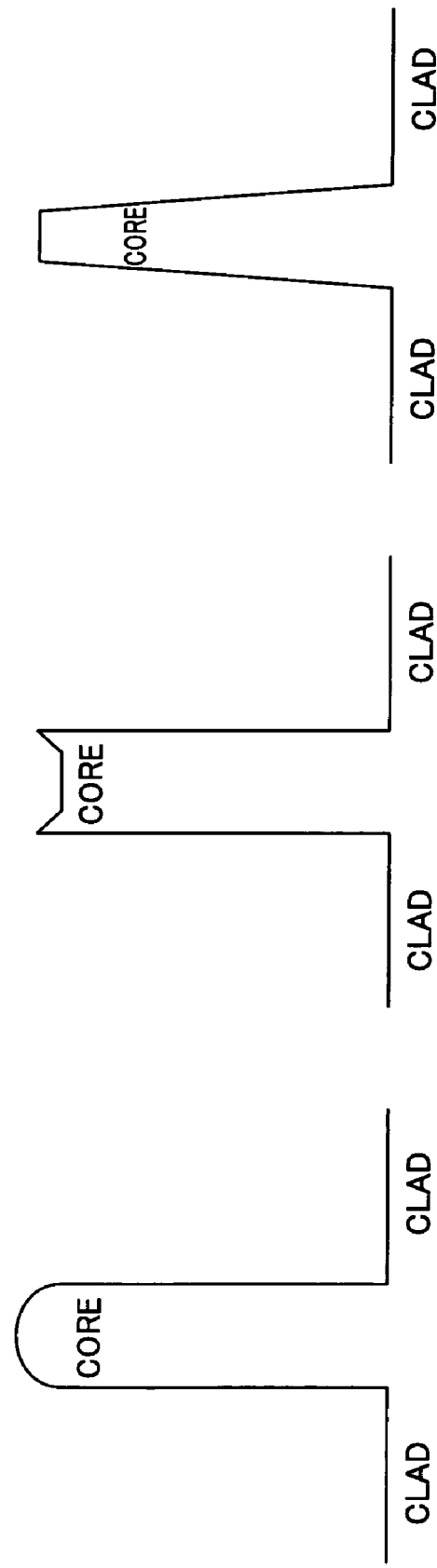

Fig.15A

| | EXAMPLE 1 | EXAMPLE 2 | EXAMPLE 3 | EXAMPLE 4 | EXAMPLE 5 | EXAMPLE 6 | EXAMPLE 7 | EXAMPLE 8 | EXAMPLE 9 | EXAMPLE 10 | EXAMPLE 11 | EXAMPLE 12 |
|---|---|---|---|---|---|---|---|---|---|---|---|---|
| MFD | 7.9 | 6.9 | 7.9 | ↓ | ↓ | ↓ | ↓ | ↓ | ↓ | ↓ | ↓ | ↓ |
| CUTOFF | 1.1 | ↓ | ↓ | ↓ | ↓ | ↓ | ↓ | ↓ | ↓ | ↓ | ↓ | ↓ |
| BENDING LOSS AT φ15 | 0.02 | 0.01 OR LESS | 0.02 | ↓ | ↓ | ↓ | ↓ | ↓ | ↓ | ↓ | ↓ | ↓ |
| INCREASE IN TRANSMISSION LOSS ON THE OCCASION OF SEPARATION | | | | | | | | | | | | |
| RIBBON THICKNESS | 0.7 | 0.5 | 0.8 | 0.6 | 0.9 | 0.7 | ↓ | ↓ | ↓ | ↓ | ↓ | ↓ |
| | 145 | ↓ | 155 | 145 | ↓ | ↓ | ↓ | ↓ | ↓ | ↓ | ↓ | ↓ |
| COLORED LAYER/ RIBBON MATRIX LAYER ADHESION | 4.9 | ↓ | ↓ | 0.3 | 5.1 | 4.9 | ↓ | ↓ | ↓ | ↓ | ↓ | ↓ |
| FIBER STRAIN | 1.5% | ↓ | ↓ | ↓ | ↓ | 1.2% | 2.5% | 1.5% | ↓ | ↓ | ↓ | ↓ |
| FIBER FATIGUE COEFFICIENT | 110 | ↓ | ↓ | ↓ | ↓ | 22 | ↓ | ↓ | 110 | ↓ | ↓ | ↓ |
| FAILURE PROBABILITY | FAILURE PROBABILITY AT φ15 IN 20 YEARS: 10⁻⁵/KM OR LESS. | | | | | FAILURE PROBABILITY AT φ15 IN 20 YEARS: 10⁻⁴/KM OR LESS. | FAILURE OF BREAK AT φ30 IN 20 YEARS: 5° 10⁻⁵/KM OR LESS. | FAILURE PROBABILITY AT φ30 IN 20 YEARS: 10⁻⁵/KM OR LESS. | ↓ | | | |
| FIBER LOSS | 0.4 | ↓ | ↓ | ↓ | ↓ | ↓ | ↓ | ↓ | ↓ | 0.6 | 0.4 | ↓ |
| FIBER DISPERSION | 11 | ↓ | ↓ | ↓ | ↓ | ↓ | ↓ | ↓ | ↓ | ↓ | 13 | ↓ |
| DIFFERENCE BETWEEN MAX VALUE AND MINI. VALUE OF CLAD DIAMETER | 0.9 | ↓ | ↓ | ↓ | ↓ | ↓ | ↓ | ↓ | ↓ | ↓ | ↓ | 1.1 |
| CONNECTOR CONNECTION LOSS | 0.6 | ↓ | ↓ | ↓ | ↓ | ↓ | ↓ | ↓ | ↓ | ↓ | ↓ | 1.1 |
| | | | | LOSS INCREASES IN A LONG TERM UNDER HIGH TEMPERATURE AND HIGH HUMIDITY | COLOR PEEL | | | | | | | |
| | | | | | TAPE MATERIAL REMAINS ON THE OCCASION OF SEPARATION | | | | | | | |
| INCREASE OF LOSS WHEN SEPARATED USING A RESIN FILM | 0.2 | 1.0 | 0.2 | 0.2 | 0.3 | | | | | | | |

Fig. 15B

| | EXAMPLE 13 | EXAMPLE 14 | EXAMPLE 15 | EXAMPLE 16 | EXAMPLE 17 | EXAMPLE 18 | EXAMPLE 19 | EXAMPLE 20 | EXAMPLE 21 | EXAMPLE 22 | EXAMPLE 23 | EXAMPLE 24 | EXAMPLE 25 |
|---|---|---|---|---|---|---|---|---|---|---|---|---|---|
| MFD | 7.9 | 6.9 | 7.9 | ↓ | ↓ | ↓ | ↓ | ↓ | ↓ | ↓ | ↓ | ↓ | ↓ |
| CUTOFF | 1.1 | ↓ | ↓ | ↓ | ↓ | ↓ | ↓ | ↓ | ↓ | ↓ | ↓ | ↓ | ↓ |
| BENDING LOSS AT φ15 | 0.02 | 0.01 OR LESS | 0.02 | ↓ | ↓ | ↓ | ↓ | ↓ | ↓ | ↓ | ↓ | ↓ | ↓ |
| INCREASE IN TRANSMISSION LOSS ON THE OCCASION OF SEPARATION | 0.7 | 0.5 | 0.8 | 0.6 | 0.9 | 0.8 | 0.7 | ↓ | ↓ | ↓ | ↓ | ↓ | ↓ |
| RIBBON THICKNESS | 145 | ↓ | 155 | 145 | ↓ | ↓ | ↓ | ↓ | ↓ | ↓ | ↓ | ↓ | ↓ |
| COLORED LAYER/ RIBBON MATRIX LAYER ADHESION | 4.9 | ↓ | ↓ | 0.3 | 5.1 | 4.9 | ↓ | ↓ | ↓ | ↓ | ↓ | ↓ | ↓ |
| RECESSIONS | YES | ↓ | ↓ | ↓ | ↓ | NO | YES | ↓ | ↓ | ↓ | ↓ | ↓ | ↓ |
| FIBER STRAIN | 1.5% | ↓ | ↓ | ↓ | ↓ | ↓ | 1.2% | 2.5% | 1.5% | ↓ | ↓ | ↓ | ↓ |
| FIBER FATIGUE COEFFICIENT | 110 | ↓ | ↓ | ↓ | ↓ | ↓ | 22 | ↓ | ↓ | 110 | ↓ | ↓ | ↓ |
| FAILURE PROBABILITY | FAILURE PROBABILITY AT φ15 IN 20 YEARS: 10⁻⁵/KM OR LESS. | | | | | | FAILURE PROBABILITY AT φ30 IN 20 YEARS: 5° 10⁻⁴/KM OR LESS. | FAILURE PROBABILITY AT φ15 IN 20 YEARS: 10⁻⁵/KM OR LESS. | FAILURE PROBABILITY OF AT φ30 IN 20 YEARS: 10⁻⁵/KM OR LESS. | | | | |
| FIBER LOSS | 0.4 | ↓ | ↓ | ↓ | ↓ | ↓ | ↓ | ↓ | ↓ | 0.6 | 0.4 | ↓ | ↓ |
| FIBER DISPERSION | 11 | ↓ | ↓ | ↓ | ↓ | ↓ | ↓ | ↓ | ↓ | ↓ | 13 | 11 | ↓ |
| DIFFERENCE BETWEEN MAX. VALUE AND MINI. VALUE OF CLAD DIAMETER | 0.9 | ↓ | ↓ | ↓ | ↓ | ↓ | ↓ | ↓ | ↓ | ↓ | ↓ | 1.1 | 0.4 |
| CONNECTOR CONNECTION LOSS | 0.6 | ↓ | ↓ | ↓ | ↓ | ↓ | ↓ | ↓ | ↓ | ↓ | ↓ | 1.1 | 0.4 |
| | | | | LOSS INCREASES IN A LONG TERM UNDER HIGH TEMPERATURE AND HIGH HUMIDITY | COLOR PEEL | | | | | | | | |
| | | | | | TAPE MATERIAL REMAINS ON THE OCCASION OF SEPARATION | | | | | | | | |

OPTICAL FIBER TAPE CORE

TECHNICAL FIELD

The present invention relates to an optical fiber ribbon comprising a plurality of optical fibers arranged in parallel in juxtaposition with each other and covered with a ribbon matrix.

BACKGROUND ART

The optical fiber ribbon is comprised of a plurality of optical fibers, wherein the plurality of optical fibers are placed in parallel in juxtaposition with each other and covered with a ribbon matrix. When the optical fiber ribbon as described above is employed, the separation of a single optical fiber is performed at the end of the optical fiber ribbon, with respect to each optical fiber whereupon the front end of each optical fiber is connected to an optical connector. By means of the optical connector, there takes place input or output of a signal light for each optical fiber.

For example, in optical fiber ribbons disclosed in Japanese Unexamined Utility Model Publication No. S61-185008 and Japanese Unexamined Utility Model Publication No. H4-75304, the periphery of a plurality of optical fibers arranged in parallel to each other is not entirely covered with a ribbon matrix, whereas only a part of the periphery is covered with a ribbon matrix and no rest thereof is covered with the ribbon matrix. Such an arrangement of the optical fiber ribbon as described above enables to facilitate performing the separation of a single optical fiber.

Meanwhile, there may happen to occur some situations that necessitate a separation of a single optical fiber at a midway portion instead of same separation at the end portion of the optical fiber ribbon. In this case, even in case of an optical fiber ribbon having the arrangement disclosed in the above publications, it is necessary to use a special tool for the sake of the separation of a single optical fiber at the midway portion.

However, there are some circumstances, under which there are already kept utilised one or more among the plurality of optical fibers incorporated in the optical fiber ribbon for communication purposes. Under such circumstances, supposing the separation of a single optical fiber is performed at a midway portion, fingers may touch an optical fiber in use, or an optical fiber in use may be sharply bent using a tool, whereby the loss pertaining to the optical fiber in use may temporarily increase. Such increase in the loss may exert any adverse influence upon the communication employing the optical fiber.

DISCLOSURE OF THE INVENTION

The present invention has been made to solve the above problems. An object of the present invention is to provide an optical fiber ribbon, which, even in case of a separation of a single optical fiber at a midway portion, enables to inhibit any increase in the loss.

According to the present invention there is provided an optical fiber ribbon comprising a plurality of optical fibers arranged in parallel in juxtaposition with each other and covered with a ribbon matrix, wherein in each of the plurality of optical fibers, the mode field diameter defined by the definition of Petermann-I at a wavelength of 1.55 µm is 8 µm or less: and the cable cutoff wavelength is 1.26 µm or less, and a part of the periphery of the plurality of optical fibers is covered with the ribbon matrix while no rest thereof is covered with the ribbon matrix. The optical fiber ribbon having the inventive feature as described above, facilitates performing the separation of a single optical fiber, since only a part of the periphery of the plurality of optical fibers is covered with the ribbon matrix. Also, since the optical fiber ribbon is excellent in bending properties, any increase in the loss can be inhibited even in case of the separation of a single optical fiber at a midway portion.

In the optical fiber ribbon according to the present invention, preferably first areas covered with said ribbon matrix and second areas uncovered with the ribbon matrix alternate with each other along the longitudinal direction thereof, and that the length of said first areas and said second areas in the longitudinal direction is 10–300 mm respectively. Furthermore in one preferable aspect of the present invention there is provided a plurality of optical fibers arranged in parallel in juxtaposition with each other, wherein with respect to the plane of the juxtapositional arrangement pertaining to a plurality of optical fibers only one side thereof is covered with said ribbon matrix. In another preferable aspect of the present invention the thickness of said ribbon matrix is as large as the size of each radius of said plurality of optical fibers or less. In any of the above aspects, a separation of the single optical fiber can be readily carried out for the optical fiber ribbon.

In the optical fiber ribbon according to a further preferable aspect of the present invention, the bending loss in case of a bending diameter of 15 mm at a wavelength of 1.55 µm is 0.1 dB/turn or less. In this case, since the optical fiber ribbon is particularly excellent in bending properties, the loss can be inhibited even in the event of the single optical fiber separation at a midway portion.

In the optical fiber ribbon according to the present invention, also preferably the cable cutoff wavelength is 1.00 µm or more. In this case, the optical fiber ribbon is suitable for use in optical communication.

In the optical fiber ribbon according to the present invention, it is still also preferable that the transmission loss of said plurality of optical fibers at a wavelength of 1.3 µm is 0.5 dB/km or less respectively. Further, it is preferred that the absolute value of the wavelength dispersion in the plurality of optical fibers at a wavelength of 1.3 µm and at a wavelength of 1.55 pm is 12 ps/nm/km or less respectively. In the above cases, a long distance optical transmission with a high quality and wide band is made possible.

In the optical fiber ribbon according to the present invention, it is furthermore preferred that an amount of the change in the loss at a wavelength of 1.55 µm at single optical fiber separation is 1.0 dB or less per optical fiber. The optical fiber ribbon preferably has the thickness (the maximum value of the distance from the optical axis center to the ribbon matrix surface of each optical fiber) of 155 µm or less in the direction perpendicular to the plane of the juxtapositional arrangement pertaining to plurality of optical fibers juxtaposed in parallel to each other. It is much more preferable that the thickness is less than 150 µm. It is preferred that each of said plurality of optical fibers is covered with a color layer, and adhesion force between said color layer and said ribbon matrix in a 180° peel test is 0.4–5.0 g/cm. Further, it is preferred that the thickness of the ribbon matrix to be determined in the thickness direction perpendicular to the plane of the juxtapositional arrangement is larger where same direction is associated with a supposed directional line extending through a location between optical fibers, than in case where same direction is associated with a supposed directional line extending through a center of any one of the optical fibers. In the above cases, since an amount of the change in the loss on the occasion of a single optical fiber separation is sufficiently small, even in the event that any of the optical fibers is used for communication purposes, it is possible to sufficiently reduce adverse influences exerted on the communication.

In the optical fiber ribbon according to the present invention, it is preferred that each of the plurality of optical fibers has passed successfully a proof test of elongation strain of 1.5% or more. In this case, when represented based on the Mitsunaga theory (J. Appl. Phys. (1982) 53), after the optical fibers has been placed being bent at a bending diameter of 30 mm for 20 years, the fracture probability is $1\times10^{-5}$/km or less. Further, it is preferred that each of said plurality of optical fibers has passed successfully in a proof test of elongation strain of 2.5% or more. In this case, after the optical fibers has been placed being bent at a bending diameter of 15 mm for 20 years, the fracture probability is $1\times10^{-5}$/km or less. Furthermore, it is preferred that the fatigue coefficient of said plurality of optical fibers is 50 or more respectively. In this case, after the optical fibers has been placed being bent at a bending diameter of 30 mm for 20 years, the fracture probability is $1\times10^{-5}$/km or less. In the above cases, in the optical fiber ribbon, even in the event of being bent to a small bending diameter, there is ensured a long term reliability.

In the optical fiber ribbon according to the present invention, it is preferred that the difference between the maximum value and the minimum value in the cladding diameter of said plurality of optical fibers is 1.0 μm or less. In this case, it is possible to reduce the connection loss between an optical fiber and an optical connector.

In the optical fiber ribbon according to the present invention, it is preferred that the thickness of the protective coating of said plurality of optical fibers is 15–37.5 μm respectively. Further, it is preferred that the protective coating of said plurality of optical fibers is comprised of a single layer respectively, and the Young's modulus of the protective coating is 10 kg/mm² or more. Furthermore, it is preferred that the protective coating of said plurality of optical fibers is comprised of a double layer respectively, the thickness of the both layers is 15–37.5 μm, the Young's modulus of the inner protective coating is 0.2 kg/mm² or less, and the Young's modulus of the outer protective coating is 10 kg/mm² or more. In the above cases, since each of the optical fibers can be reduced in diameter, an optical fiber ribbon in which optical fibers are arranged with high density can be achieved.

The optical fiber ribbon according to the present invention is an optical fiber ribbon comprised of the plurality of optical fibers arranged in parallel to each other being covered with the ribbon matrix, wherein, in each of the plurality of optical fibers, the mode field diameter defined by the definition of Petermann-I at a wavelength of 1.55 μm is 8 μm or less; the cable cutoff wavelength is 1.26 μm or less; and bending loss with a bending diameter of 15 mm at a wavelength of 1.55 μm is 0.1 dB/turn or less. The optical fiber ribbon having the characteristics as described above is excellent in bending property, and hence, even when the separation of a single optical fiber is performed in a midway portion, it is possible to prevent the loss from increasing.

BRIEF DESCRIPTION OF THE DRAWINGS

FIG. 1 is a perspective view of an optical fiber ribbon 1 according to Embodiment 1.

FIG. 11A, FIG. 11B and FIG. 11C are a diagram respectively showing an example of profile of refractive index of a glass section $10_A$ in the optical fiber 10.

FIG. 15A and FIG. 15B are a chart respectively representing property of the optical fiber ribbon in each embodiment.

BEST MODE FOR CARRYING OUT THE INVENTION

Figure 2A:
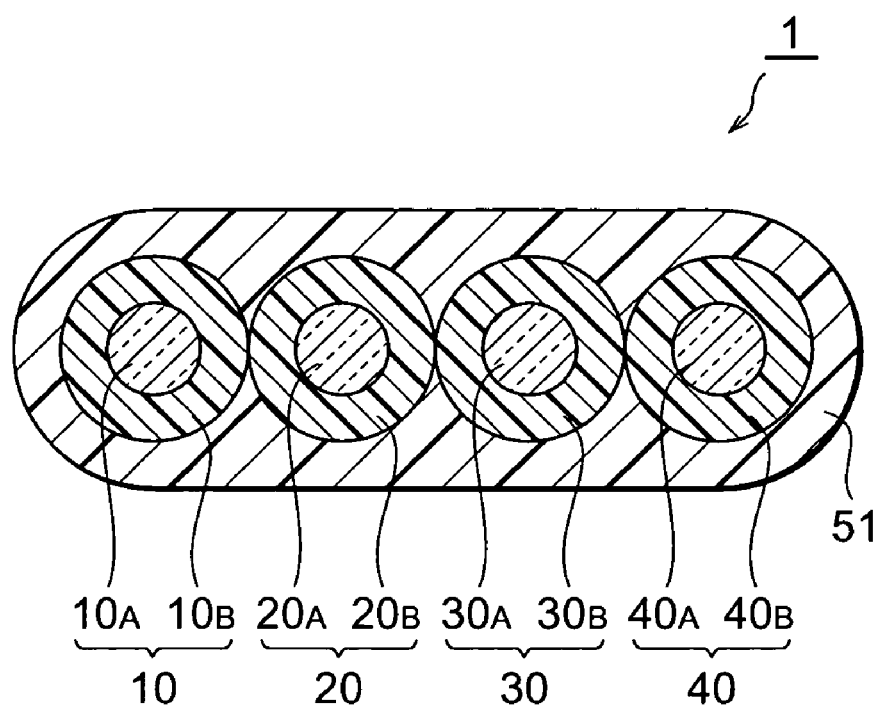
FIG. 2A and FIG. 2B are a sectional view of the optical fiber ribbon 1 respectively according to Embodiment 1.

Hereinafter, referring to the attached drawings, embodiments of the present invention will be described in detail. In the description of the drawings, the same elements will be given with the same reference numerals and redundant descriptions will be omitted.

Figure 2B:
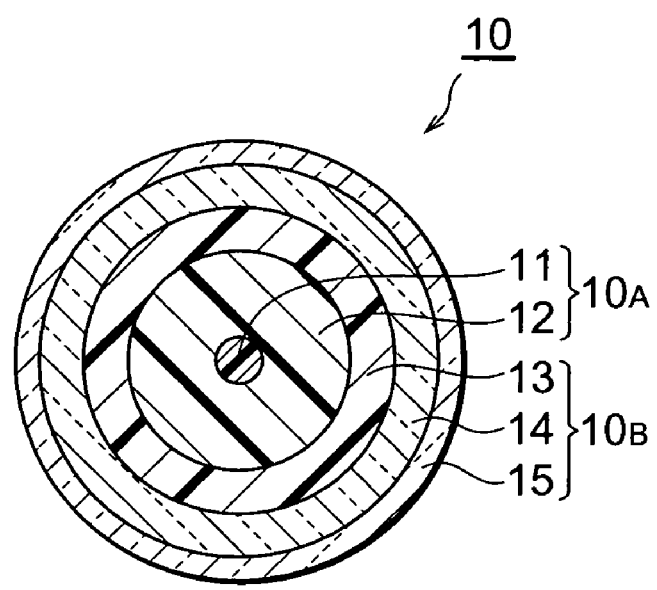

FIG. 1 is a perspective view of an optical fiber ribbon 1 according to Embodiment 1. FIG. 2A and FIG. 2B are a sectional view of an optical fiber ribbon 1 respectively according to Embodiment 1. FIG. 2A shows a section of a portion in the optical fiber ribbon 1, where is covered with a ribbon matrix. FIG. 2B shows a section of an optical fiber 10. Both are a section respectively cut off along a plane perpendicular to the optical axis. Each of the other optical fibers 20, 30 and 40 has the same structure as that of the optical fiber 10.

As shown in FIG. 1 and FIG. 2A, in the optical fiber ribbon 1, four optical fibers 10, 20, 30 and 40 are arranged in parallel to each other in a plane. The periphery of these four optical fibers are partially covered with a ribbon matrix 51, but no rests thereof are covered with the ribbon matrix. The optical fiber 10 includes a glass section $10_A$ and a coat layer $10_B$ surrounding the glass section $10_A$. The optical fiber 20 includes a glass section $20_A$ and a coat layer $20_B$ surrounding the glass section $20_A$. The optical fiber 30 includes a glass section $30_A$ and a coat layer $30_B$ surrounding the glass section $30_A$. The optical fiber 40 includes a glass section $40_A$ and a coat layer $40_B$ surrounding the glass section $40_A$.

Particularly, in the optical fiber ribbon 1 according to Embodiment 1, there alternate with each other first areas covered with the ribbon matrix 51 and second areas uncovered with the ribbon matrix along the longitudinal direction. The length in the longitudinal direction of the first areas and the second areas is preferably 10–300 mm. When the length of the first areas is shorter than 10 mm, there is a possibility that the ribbon matrix 51 is accidentally divided. When the length of the first areas is longer than 300 mm, it is hard to separate a single optical fiber. Also, when the length of the second areas is shorter than 10 mm, it is hard to separate a single optical fiber. When the length of the second areas is longer than 300 mm, there is a possibility that the ribbon matrix 51 is accidentally divided.

The ribbon matrix 51 is comprised of, for example, a UV curable resin, and the thickness thereof at the center of the optical fiber is preferably equal to the radius or less of each optical fiber. The first areas and the second areas can be formed by intermittently supplying the ribbon matrix when applying the ribbon matrix using a coating die.

As shown in FIG. 2B, the optical fiber 10 has, from the center of optical axis in order, a optical fiber portion 11, a cladding area 12, an inner protective coating 13, an outer protective coating 14 and a pigmented layer 15. Each of the optical fiber portion 11 and the cladding area 12 comprises silica glass as a main component respectively, and are included in the glass section $10_A$. The outer diameter of the glass section $10_A$ is 125 μm. Each of the inner protective coating 13, the outer protective coating 14 and the pigmented layer 15 is comprised of, for example, a UV curable resin and is included in the coat layer 10B. The outer diameter of the coat layer 10B is approximately 250 μm. The inner protective coating 13 is comprised of a relatively soft resin, and the Young's modulus thereof is approximately 0.01–0.2 kg/mm². The outer protective coating 14 is formed of a relatively hard resin, and the Young's modulus thereof is 10 kg/mm² or more; preferably, the Young's modulus thereof is approximately 40–100 kg/mm². The outermost-pigmented layer 15 has a particular color for identifying the optical fiber 10 out of the four optical fibers.

In the Embodiment 1, as described later, the glass section $10_A$ in the optical fiber 10 is excellent in bending property. Accordingly, the protective coating may not be comprised of a double layer such as the inner protective coating 13 and the outer protective coating 14, but the protective coating may be comprised of a single layer. When the protective coating is comprised of a single layer, a resin of which Young's modulus is approximately 10–60 kg/mm² is used for the protective coating. Also, the outer diameter of the protective coating may be small. When the protective coating is comprised of a single layer, the film thickness of the protective coating may be, for example, approximately 20–40μm. When the protective coating is comprised of a double layer, the protective coating may be, for example, approximately 15–50 μm. Preferably, the thickness of the protective coating is 15–37.5 μm. Further, the outer diameter of the glass section $10_A$ also may be small as approximately 60–100 μm. As described above, since the diameter of each optical fiber can be reduced, a high-density optical fiber ribbon can be achieved.

Figure 3A:
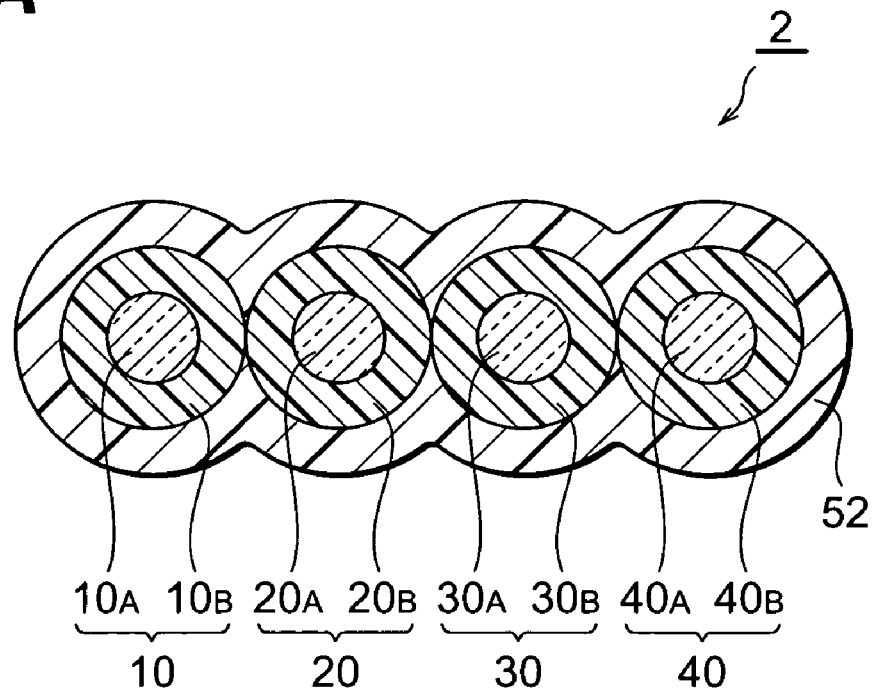
FIG. 3A is a sectional view of an optical fiber ribbon 2 according to Embodiment 2.

FIG. 3A is a sectional view of an optical fiber ribbon 2 according to Embodiment 2. FIG. 3A shows a section of a portion where is covered with a ribbon matrix in the optical fiber ribbon 2. Same as the optical fiber ribbon 1 (FIG. 1, FIG. 2A and FIG. 2B) according to the above-described Embodiment 1, the optical fiber ribbon 2 according to the Embodiment 2 shown in FIG. 3A includes first areas covered with a ribbon matrix 52 and second areas uncovered with the ribbon matrix along the longitudinal direction alternately. The length of the first areas and the second areas in the longitudinal direction is preferably 10–300 mm respectively. The ribbon matrix 52 is, for example, comprised of a UV curable resin; and the thickness thereof is preferably as large as the size of each radius of said plurality of optical fibers or less. As compared with the optical fiber ribbon 1 according to the Embodiment 1, the optical fiber ribbon 2 according to the Embodiment 2 is different therefrom in shape of the section of the optical fiber ribbon 2. In this Embodiment 2 of the optical fiber ribbon 2, there is smaller the thickness of the ribbon matrix 52 to be determined in the thickness direction perpendicular to the plane of the juxtapositional arrangement pertaining to the four optical fibers 10, 20, 30 and 40 in case where same direction is associated with a supposed directional line extending through a location between optical fibers each other, than in case where same direction is associated with a supposed directional line extending through a center of the four optical fibers. That is, in the position between the optical fiber 10 and the optical fiber 20, in the position between the optical fiber 20 and in the optical fiber 30, and in the position between the optical fiber 30 and the optical fiber 40, respectively, the surface of the ribbon matrix 52 is sunken. As compared with the above-described optical fiber ribbon 1, the arrangement of the optical fiber ribbon 2 as described above facilitates separating a single optical fiber.

The optical fiber ribbon according to the Embodiment 2 can be fabricated by applying the ribbon matrix by means of a coating die having a hole with a shape of section formed in such a manner that the thickness of the optical fiber ribbon becomes smaller in the position between the optical fibers each other.

Figure 4:
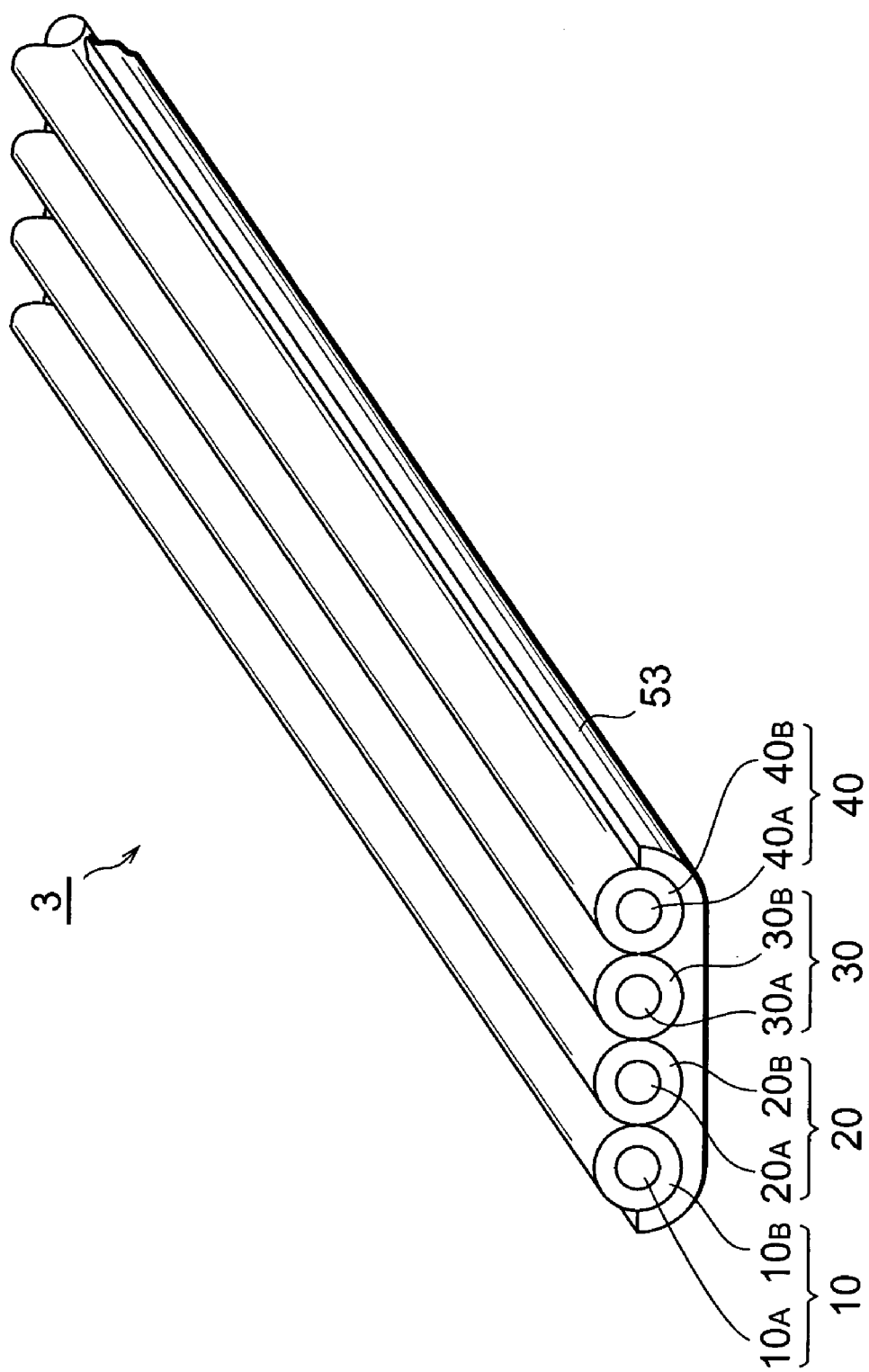
FIG. 4 is a perspective view of an optical fiber ribbon 3 according to Embodiment 3.
Figure 5:
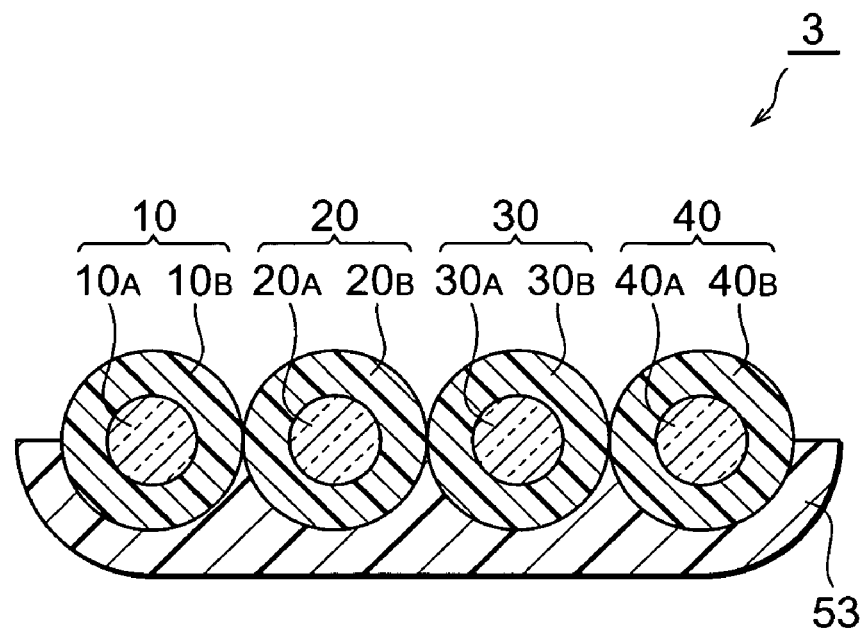
FIG. 5 is a sectional view of the optical fiber ribbon 3 according to Embodiment 3.

FIG. 4 is a perspective view of an optical fiber ribbon 3 according to Embodiment 3. FIG. 5 is a sectional view of the optical fiber ribbon 3 according to the Embodiment 3. In the optical fiber ribbon 3, four optical fibers 10, 20, 30 and 40 are arranged in apparel in juxtaposition with each other in a certain plane, whereas a part of the periphery of the four optical fibers is covered with a ribbon matrix 53, but the rest thereof is not covered with the ribbon matrix. The ribbon matrix 53 is comprised of, for example, a UV curable resin, and the thickness thereof at the center of the optical fiber is preferably as large as the size of the radius of each optical fiber or less. Particularly, in the optical fiber ribbon 3 according to the Embodiment 3, only a one side with respect to the plane in which four optical fibers 10, 20, 30 and 40 are arranged is covered with the ribbon matrix 53; and the other side thereof is not covered with the ribbon matrix. As compared with the above-described optical fiber ribbon 1, the optical fiber ribbon 3 arranged as described above allows a single optical fiber to be readily separated. In the Embodiment 3 also, same as in the Embodiment 1, first areas covered with the ribbon matrix 53 and second areas uncovered with the ribbon matrix are preferably included alternately along the longitudinal direction. In this case, the length of the first areas and second areas in the longitudinal direction is preferably 10–300 mm respectively.

Also, the covered first areas may exist alternately on the opposite sides relative to each other. The optical fiber ribbon covered with the ribbon matrix on only one side can be formed by disposing a dispenser at one side with respect to the plane where the optical fibers are arranged in parallel in juxtaposition with each other and by supplying the ribbon matrix from the dispenser.

Figure 6:
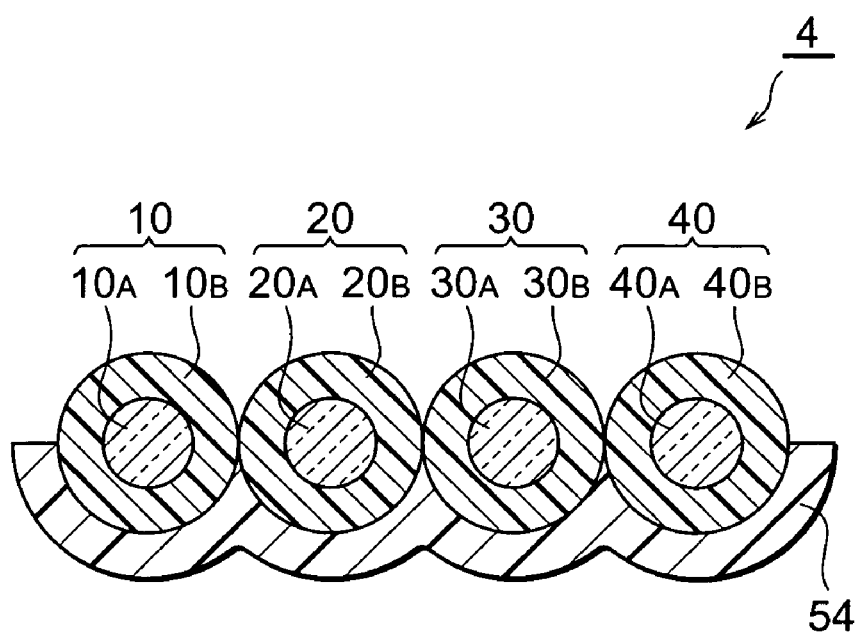
FIG. 6 is a sectional view of an optical fiber ribbon 4 according to Embodiment 4.

FIG. 6 is a sectional view of an optical fiber ribbon 4 according to Embodiment 4. In case of the optical fiber ribbon 4 according to the Embodiment 4 shown in FIG. 6, with respect to a plane where four optical fibers 10, 20, 30 and 40 are arranged in parallel to each other, only one side thereof is covered with a ribbon matrix 53, and the other side thereof is not covered with the ribbon matrix, as is the case with the above-described optical fiber ribbon 3 (FIG. 4, FIG. 5) according to the Embodiment 3. The ribbon matrix 54 is, for example, comprised of a UV curable resin, and the thickness thereof is preferably equal to the radius or less of each optical fiber. As compared with the arrangement of the optical fiber ribbon 3 according to the Embodiment 3, the optical fiber ribbon 4 according to the Embodiment 4 is different therefrom in the sectional view of the ribbon matrix 54. In the optical fiber ribbon 4, there is smaller the thickness of the ribbon matrix 54 to be determined in the direction perpendicular to the plane of the juxtaposition arrangement pertaining to the four optical fibers 10, 20, 30 and 40 arranged in parallel to each other, in case where same direction is associated with a supposed directional line, containing a specific positional location between two adjacent optical fibers from among the four optical fibers, than in case where same direction is associated with a supposed directional line extending through a specific location of a center of the four optical fibers. That is, the surface of the ribbon matrix 54, is sunken in a position between the optical fiber 10 and the optical fiber 20, in a position between the optical fiber 20 and the optical fiber 30 and, in a position between the optical fiber 30 and the optical fiber 40 respectively. As compared with the above-described optical fiber ribbon 3, the optical fiber ribbon 4 arranged as described above allows a single optical fiber to be readily separated. In the Embodiment 4 also, as is the case with the Embodiment 1, the first areas covered with the ribbon matrix 54 and the second areas not covered with the ribbon matrix are preferably formed on the same side or the opposite side alternately along the longitudinal direction. In this case, the length of the first areas and second areas in the longitudinal direction is preferably 10–300 mm respectively.

The optical fiber ribbon according to the Embodiment 4 can be formed by, immediately after the ribbon matrix is applied by a dispenser, removing the ribbon matrix in the sunken portions with a butt strap plate or the like, and then curing the remaining ribbon matrix.

Figure 7:
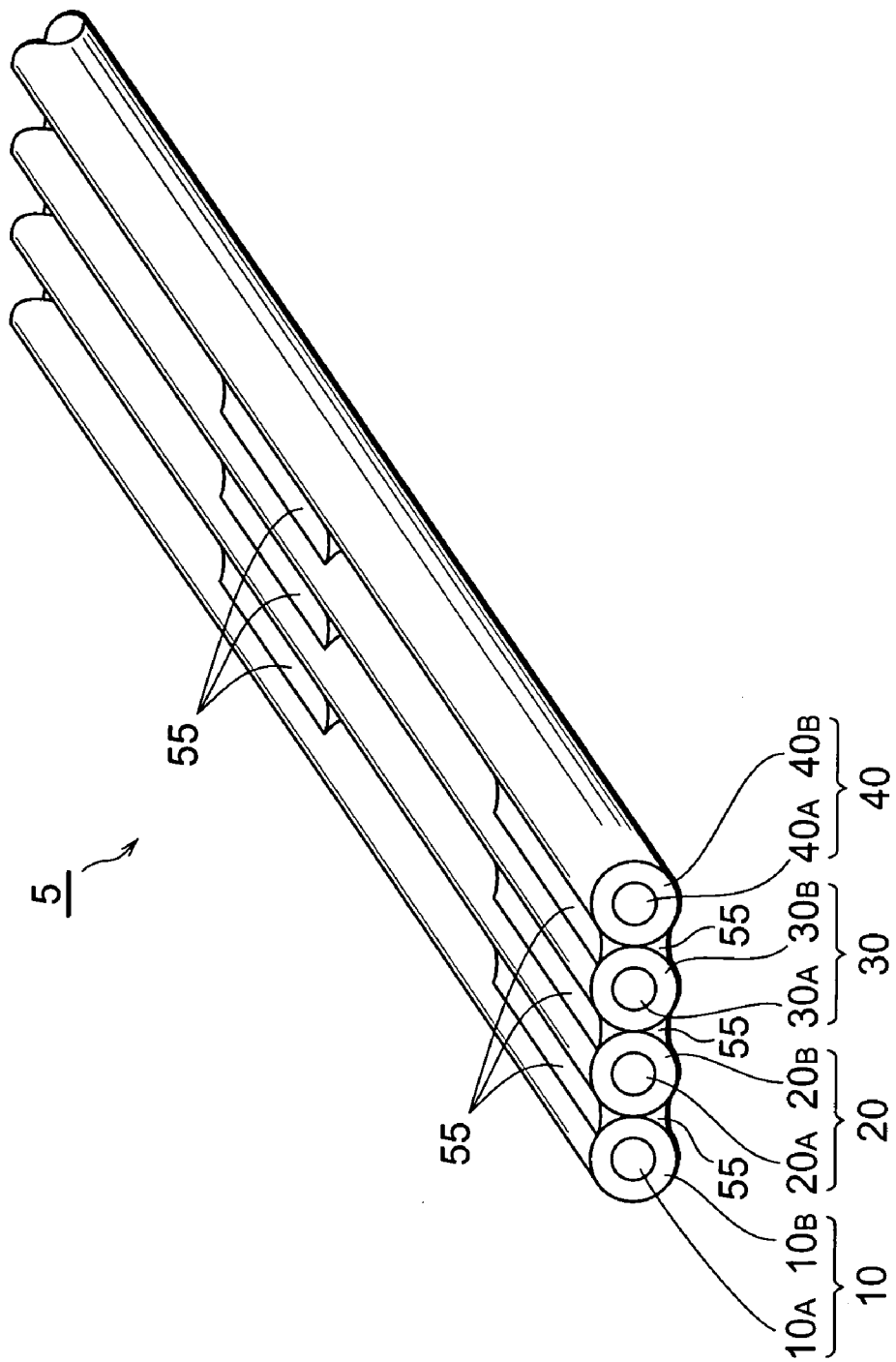
FIG. 7 is a perspective view of an optical fiber ribbon 5 according to Embodiment 5.
Figure 8:
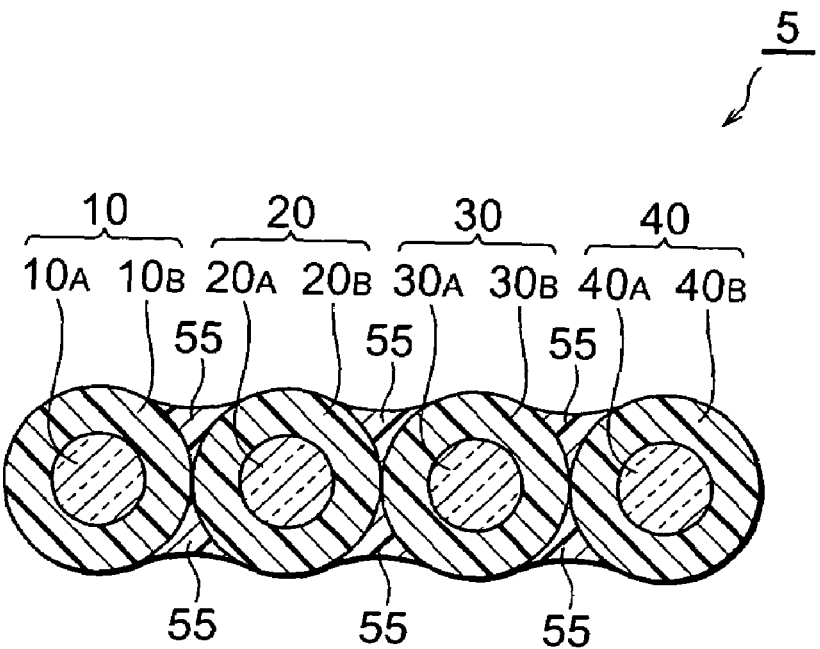
FIG. 8 is a sectional view of the optical fiber ribbon 5 according to Embodiment 5.

FIG. 7 is a perspective view of an optical fiber ribbon 5 according to Embodiment 5. FIG. 8 is a sectional view of the optical fiber ribbon 5 according to the Embodiment 5. In the optical fiber ribbon 5, four optical fibers 10, 20, 30 and 40 are arranged in parallel to each other in a plane, and a part of the periphery of the four optical fibers is covered with a ribbon matrix 55, but the rest thereof is not covered with the ribbon matrix. The ribbon matrix 55 is comprised of, for example, a UV curable resin and the thickness thereof is preferably equal to the radius or less of each optical fiber. Particularly, the optical fiber ribbon 5 according to the Embodiment 5, first areas covered with the ribbon matrix 55 and second areas not covered with the ribbon matrix alternate with each other along the longitudinal direction. Preferably, the length of each first areas and second areas in the longitudinal direction is 10–300 mm. In the first areas covered with the ribbon matrix 55, the both sides with respect to the plane where four optical fibers 10, 20, 30 and 40 are arranged in parallel to each other are covered with the ribbon matrix 55, but the periphery thereof is not entirely covered with the ribbon matrix 55. That is, the ribbon matrix 55 connecting the optical fiber 10 and the optical fiber 20, the ribbon matrix 55 connecting the optical fiber 20 and the optical fiber 30 and the ribbon matrix 55 connecting the optical fiber 30 and the optical fiber 40 are separated from each other. As compared with the above-described optical fiber ribbon 1, the optical fiber ribbon 5 arranged in such a manner allows a single optical fiber to be readily separated. In the Embodiment 5, the first areas and the second areas may not be formed one after other along the longitudinal direction, but may be entirely covered with the ribbon matrix 55 in the longitudinal direction.

The optical fiber ribbon according to the Embodiment 5 can be formed by applying the ribbon matrix using a dispenser while adjusting the supply amount of the ribbon matrix to an extremely small amount so that the applied ribbon matrix bonds two optical fibers but not to bond three or more optical fibers.

Figure 9:
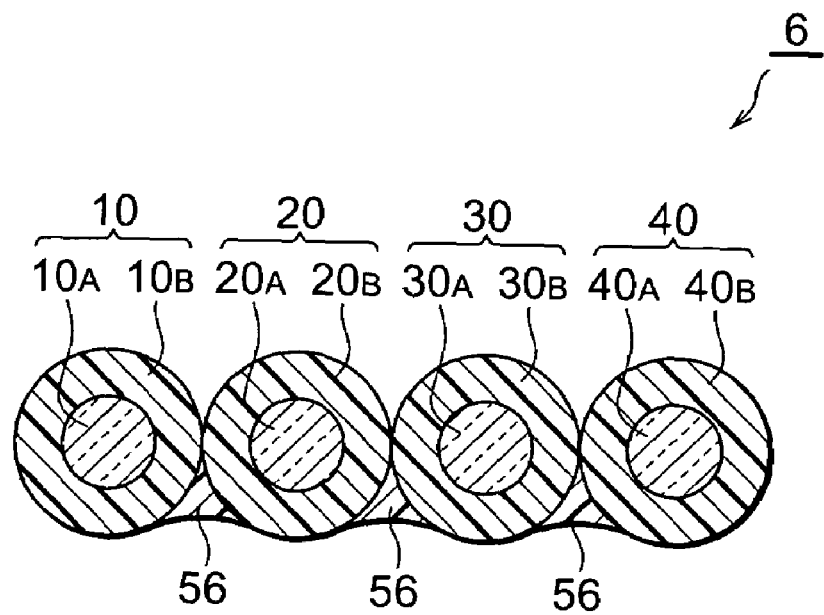
FIG. 9 is a sectional view of an optical fiber ribbon 6 according to Embodiment 6.

FIG. 9 is a sectional view of an optical fiber ribbon 6 according to Embodiment 6. In the optical fiber ribbon 6 according to the Embodiment 6 shown in FIG. 9, four optical fibers 10, 20, 30 and 40 are arranged in a plane in parallel to each other. A part of the periphery of the four optical fibers is covered with a ribbon matrix 55, but the rest thereof is not covered the ribbon matrix. The ribbon matrix 56 is comprised of, for example, a UV curable resin and the thickness thereof is preferably equal to the radius or less of each optical fiber. The first areas covered with the ribbon matrix 56 and the second areas not covered with the ribbon matrix alternate with each other along the longitudinal direction. The length of each first areas and second areas in the longitudinal direction is preferably 10–300 mm. In the first areas covered with the ribbon matrix 56, with respect to the plane where the four optical fibers 10, 20, 30 and 40 are arranged in parallel to each other, only one side thereof is covered with the ribbon matrix 56, but the entire other side thereof is not covered by the ribbon matrix 56. That is, the ribbon matrix 56 bonding the optical fiber 10 and the optical fiber 20, the ribbon matrix 56 bonding the optical fiber 20 and the optical fiber 30 and the ribbon matrix 56 bonding the optical fiber 30 and the optical fiber 40 are separated from each other. As compared with the above-described optical fiber ribbon 5, the optical fiber ribbon 6 constituted as described above allows a single optical fiber to be readily separated. In the Embodiment 6 also, the first areas and the second areas may not be arranged alternately in the longitudinal direction, but the entire thereof in the longitudinal direction may be covered with the ribbon matrix 56.

In the Embodiment 1 through the Embodiment 6, it is preferred that the length of the first areas covered with the ribbon matrix is greater than the length of the second areas not covered with the ribbon matrix. When the optical fiber ribbon is used for the purpose of communication over the range of several km or longer away from each other, it is important that the optical fiber ribbon is not separated into the respective fiber strands due to a force, which is applied during such process that optical fiber ribbons are gathered to form a communication cable, or while the communication cable is laid down. By forming the first areas longer than the second areas, it is possible to prevent the optical fiber ribbon from being separated from each other.

Figure 2C:
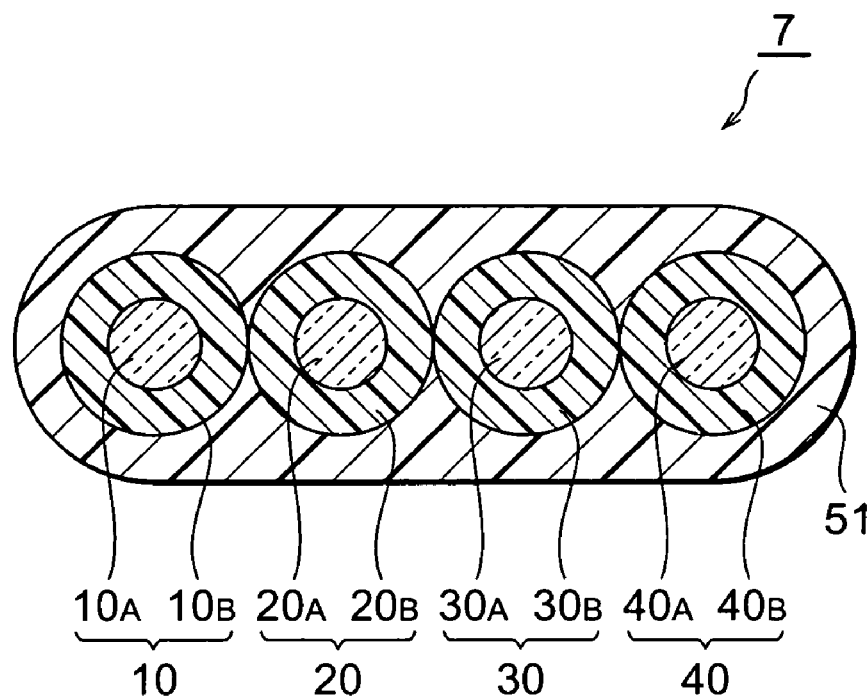
FIG. 2C and FIG. 2D are a sectional view of an optical fiber ribbon 7 respectively according to Embodiment 7.
Figure 2D:
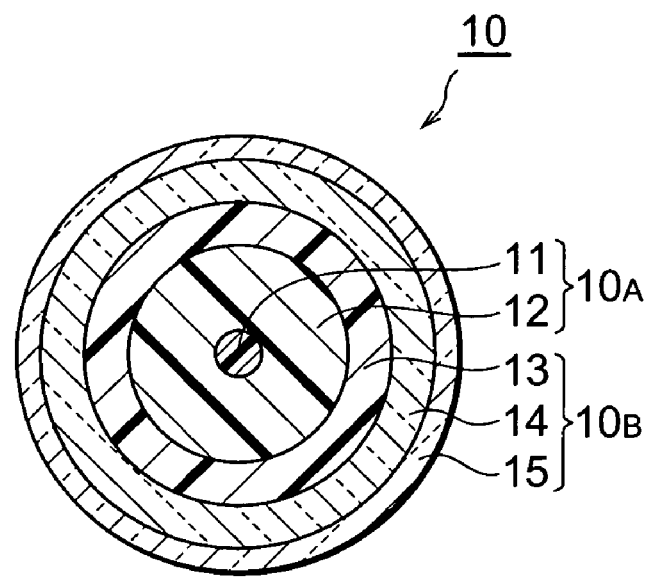

FIG. 2C and FIG. 2D are sectional views of an optical fiber ribbon 7 according to Embodiment 7. FIG. 2C shows a section of the optical fiber ribbon 7; FIG. 2D shows a section of an optical fiber 10. Both of these views show sections obtained by cuttng off the optical fiber along a plane perpendicular to the optical axis. The optical fiber ribbon 7 shown in FIG. 2C has four optical fibers. Each of the other optical fibers 20, 30 and 40 has the same structure as the optical fiber 10.

As shown in FIG. 2C, in the optical fiber ribbon 7, four optical fibers 10, 20, 30 and 40 are arranged in a plane in parallel to each other. Different from the Embodiments 1–6, the entire periphery in full length of these four optical fibers is covered with a ribbon matrix 51 in the longitudinal direction. The optical fiber 10 includes a glass section $10_A$ and a coat layer $10_B$ surrounding the same. The optical fiber 20 includes a glass section $20_A$ and a coat layer $20_B$ surrounding the same. The optical fiber 30 includes a glass section $30_A$ and a coat layer $30_B$ surrounding the same. The optical fiber 40 includes a glass section $40_A$ and a coat layer $40_B$ surrounding the same. The ribbon matrix 51 is comprised from, for example, a UV curable resin.

As shown in FIG. 2D, the optical fiber 10 comprises, from the center of the optical axis arranged in order, a optical fiber portion 11, a cladding area 12, an inner protective coating 13, an outer protective coating 14 and a pigmented layer 15. The optical fiber portion 11 and the cladding area 12 include silica glass as a main component respectively, and are included in the glass section $10_A$. The outer diameter of the glass section $10_A$ is 125 μm. Each of the inner protective coating 13, the outer protective coating 14 and the colored layer 15 is comprised of, for example, a UV curable resin and are included in the coat layer $10_B$. The outer diameter of the coat layer $10_B$ is approximately 250 μm. The inner protective coating 13 is formed of a relatively soft resin, and the Young's modulus thereof is approximately 0.01–0.2 kg/mm². The outer protective coating 14 is formed of a relatively hard resin, and the Young's modulus thereof is 10 kg/mm² or more; preferably, the Young's modulus thereof is approximately 40–100 kg/mm². The outermost-pigmented layer 15 has a particular color for identifying the optical fiber 10 out of the four optical fibers.

In the Embodiment 7, as will be described later, the glass section $10_A$ of the optical fiber 10 is excellent in the bending property. Consequently, the protective coating may not be comprised of a double layer such as the inner protective coating 13 and the outer protective coating 14, but the protective coating may be comprised of a single layer only. In the case where the protective coating is comprised of a single layer, a resin of which Young's modulus is approximately 10–60 kg/mm² is used for the protective coating. Also, the protective coating may be small in the outer diameter. Accordingly, when the protective coating is comprised of a single layer, the film thickness of the protective coating may be, for example, approximately 20–40 μm. When the protective coating is comprised of a double layer, the film thickness of the protective coating may be, for example, approximately 15–50 μm. The thickness of the protective coating is preferably 15–37.5 μm. Further, the outer diameter of the glass section $10_A$ may be as small as on the order of 60–100 μm. As described above, since the diameter of the optical fibers can be reduced respectively, an optical fiber ribbon in which optical fibers are arranged with a high density can be achieved.

Figure 3B:
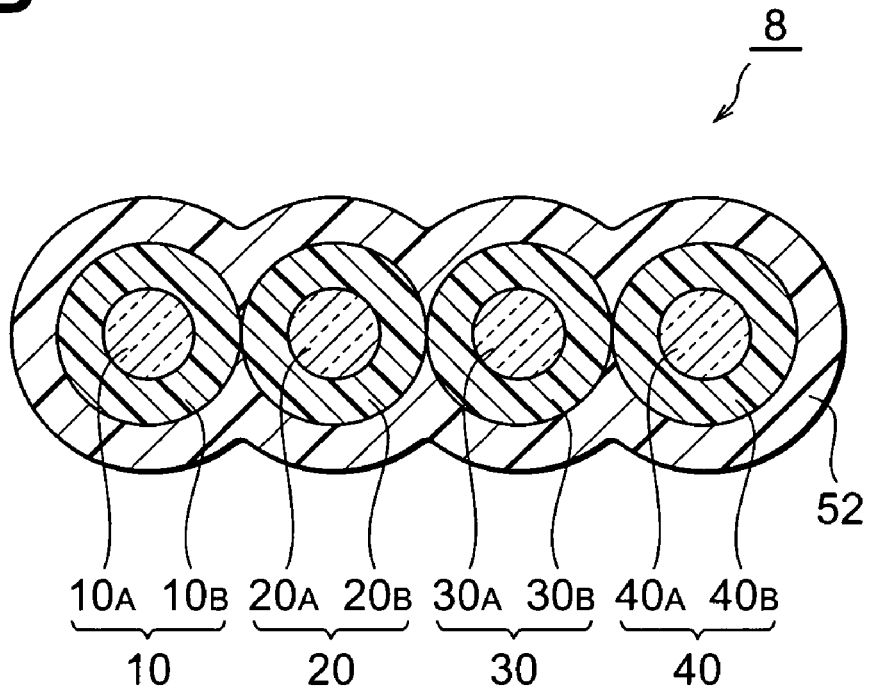
FIG. 3B is a sectional view of an optical fiber ribbon 8 according to Embodiment 8.

FIG. 3B is a sectional view of an optical fiber ribbon 8 according to an Embodiment 8. The section is a view of the optical fiber ribbon obtained by cutting along a plane perpendicular to the optical axis. In the optical fiber ribbon 8 shown in FIG. 3B, four optical fibers 10, 20, 30 and 40 are arranged in a plane in parallel to each other, and these four optical fibers are covered with a ribbon matrix 51. As compared with the optical fiber ribbon 7 shown in the above-described FIG. 2C and FIG. 2D, the optical fiber ribbon 8 is different in the shape of the section of the ribbon matrix 52.

In the optical fiber ribbon 8, there is smaller the thickness of the optical fiber ribbon 8 to be determined in the thickness direction perpendicular to the plane of the juxtaposition arrangement pertaining pertaining to the four optical fibers 10, 20, 30 and 40 in case where same direction is associated with a supposed directional line extending through a location between between optical fibers each other, than in case where same direction is associated with a supposed directional line extending through a center of the plurality of optical fibers. That is, in each of the position between the optical fiber 10 and the optical fiber 20, the position between the optical fiber 20 and the optical fiber 30 and the position between the optical fiber 30 and the optical fiber 40, the surface of the ribbon matrix 52 is sunken. Accordingly, as compared with the above-described optical fiber ribbon 1, the optical fiber ribbon 2 allows a single optical fiber to be readily separated.

Next, the glass section $10_A$ of the optical fiber 10 included in each the optical fiber ribbons 1–8 will be described in further detail. Such is also the case with each glass section of the other optical fibers 20, 30 and 40.

Figure 10A:
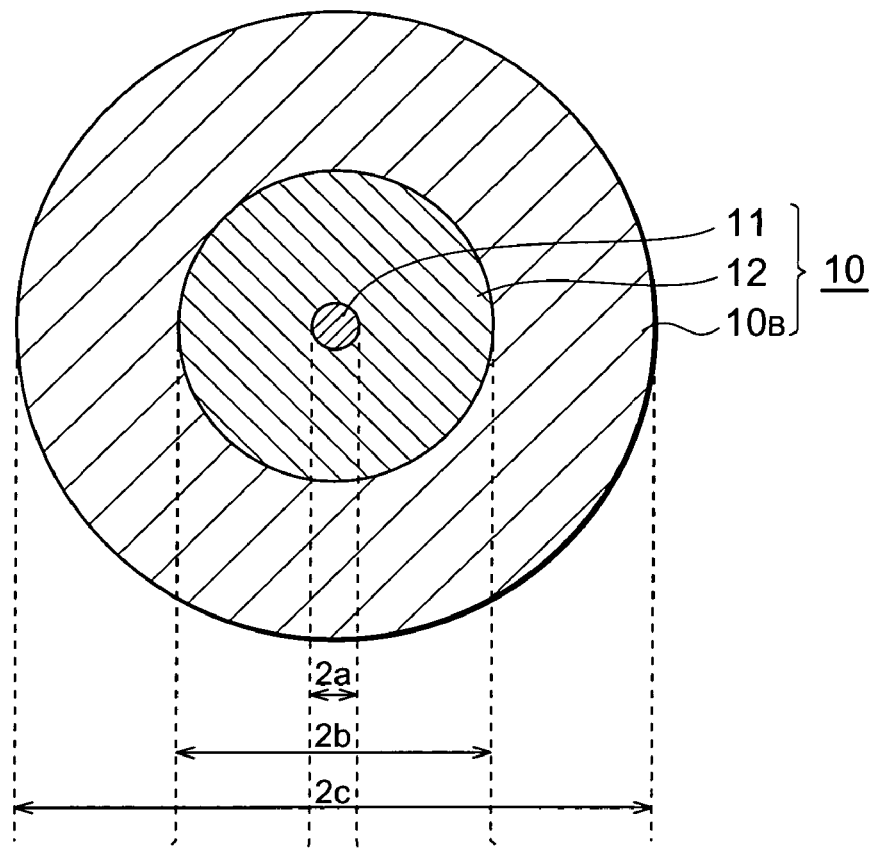
FIG. 10A and FIG. 10B are a schematic illustration respectively of an optical fiber 10.
Figure 10B:
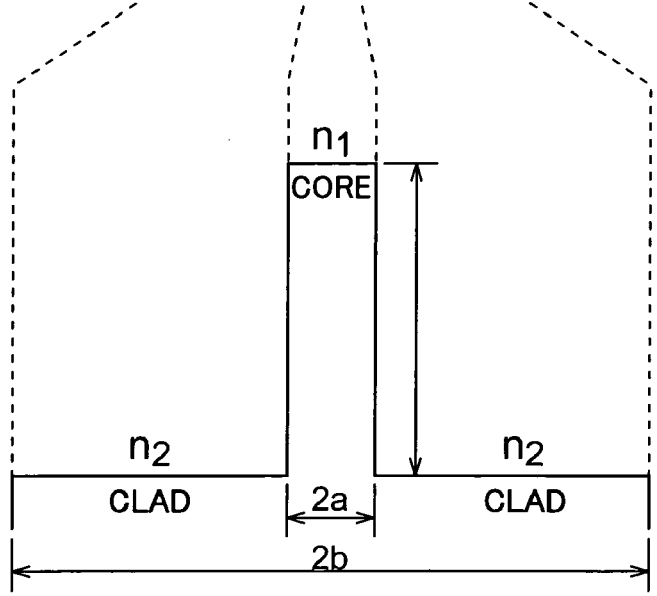

FIG. 10A and FIG. 10B are schematic illustrations of an optical fiber 10. FIG. 10A is a sectional view showing the optical fiber, wherein the view is obtained by cutting along a plane perpendicular to the optical axis. FIG. 10B shows a profile of refractive index of a glass section $10_A$ of the optical fiber 10. The optical fiber 10 comprises a optical fiber portion 11 of outer diameter 2a including the optical axis center, a cladding area 12 of outer diameter 2b surrounding the optical fiber portion 11 and a coat layer 10B of outer diameter 2c surrounding the cladding area 12.

The optical fiber portion 11 and cladding area 12 are comprised of silica glass ($SiO_2$) as a major material. Both or either one of the optical fiber portion 11 and cladding area 12 includes an additive for adjusting the refractive index. The refractive index $n_1$ of the optical fiber portion 11 is adapted so as to be higher than the refractive index $n_2$ of the cladding area 12. Preferably, the optical fiber portion 11 has the refractive index distribution having a substantially single peak shape, and the cladding area 12 has a substantially constant refractive index. In this case, since the profile of refractive index is simple, the optical fiber 10 can be manufactured easily.

The refractive index distribution of the optical fiber portion 11 having a "substantially single peak shape" includes, in addition to the ideal step-like shape as shown in FIG. 10B, a shape in which the refractive index rises toward the center of the optical fiber as shown in FIG. 11A, a shape which is a substantially step-like shape but the refractive index rises slightly in the vicinity of the edges as shown in FIG. 11B and a shape which is substantially step-like shape but the refractive index decreases in the vicinity of the edges as shown in FIG. 11C or the like.

Preferably, for example, the optical fiber portion 11 is comprised of a silica glass added with $GeO_2$, and the cladding area 12 is comprised of a silica glass added with F element. Or, the optical fiber portion 11 is comprised of a silica glass added with $GeO_2$, and the cladding area 12 is comprised of a substantially pure silica glass. The optical fiber portion 11 may include another refractive index raising additive, and the cladding area 12 may include another refractive index decreasing additive. Owing to that an additive for adjusting the refractive index as described above is included, the glass section $10_A$ of the optical fiber 10 can have a desired profile of the refractive index.

In the glass section $10_A$ of the optical fiber 10, the cladding area 12 preferably has a shape of section, which is close to a perfect cylindrical shape, and it is preferred that the difference between the maximum value and the minimum value of the cladding diameter 2b is 1.0 µm or less. In this case, there is small the connection loss when the glass section $10_A$ of the optical fiber 10 is connected to an optical connector.

In the glass section $10_A$ of the optical fiber 10, the mode field diameter defined by the definition of Petermann-I at wavelength of 1.55 µm is 8 µm or less. Here, the mode field diameter MFD according to the definition of Petermann-I is defined by the following formula:

$$MFD = 2\left(2\frac{\int_0^\infty \phi^2(r)r^3\,dr}{\int_0^\infty \phi^2(r)r\,dr}\right)^{\frac{1}{2}}$$ [Equation 1]

wherein, in the above expression, parameter r is a distance in the diameter direction from the optical axis of the glass section $10_A$ of the optical fiber 10. ϕ(r) is an electric field distribution of the light in the diameter direction. The electric field distribution varies depending on the wavelength of the light.

The cable cutoff wavelength of the glass section $10_A$ of the optical fiber 10 is 126 µm or less. The preferred cable cutoff wavelength is 1.00 µm or more. The cable cutoff wavelength is a cutoff wavelength in $LP_{11}$ mode at a length of 22 m; the value is smaller than 2 m cutoff wavelength. In the glass section $10_A$ of the optical fiber 10, when the bending diameter is 15 mm, the bending loss is 0.1 dB/turn or less at a 1.55 µm wavelength.

Figure 12:
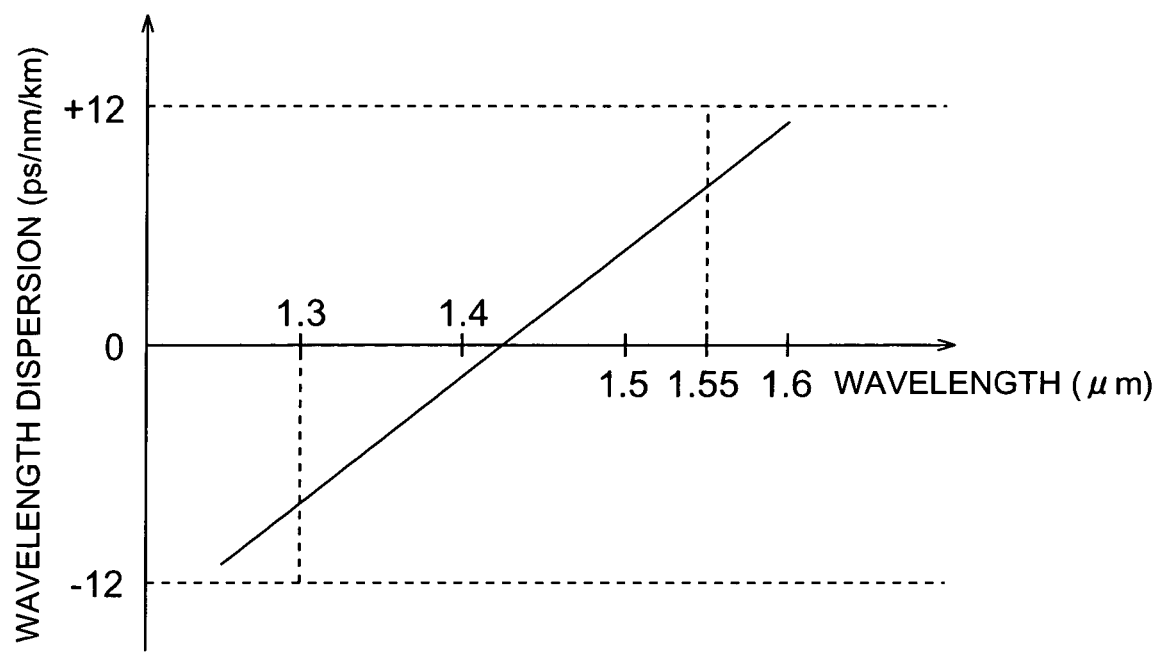
FIG. 12 is a graph showing property of wavelength dispersion in the glass section $10_A$ of the optical fiber 10.

FIG. 12 is a graph showing property of wavelength dispersion in the glass section $10_A$ of the optical fiber 10. As shown in FIG. 12, the glass section $10_A$ of the optical fiber 10 has zero dispersion wavelength between a 1.31 µm wavelength and a 1.55 µm wavelength; the absolute value of the wavelength dispersion at a 1.3 µm wavelength is 12 ps/nm/km or less, and the absolute value of the wavelength dispersion at a 1.55 µm wavelength is 12 ps/nm/km or less.

In the glass section $10_A$ of the optical fiber 10, the mode field diameter and the cable cutoff wavelength at a 1.55 µm wavelength have a value within the above-described range respectively. Such is also the case with the other optical fibers 20, 30 and 40. Thus, each of the optical fiber ribbons 1–6 according to the respective embodiments becomes excellent in bending properties. Such being the case, even when a separation of a single optical fiber is performed at a midway portion, there can be prevented any increase in the transmission loss. Therefore, even in the event that some of optical fibers 10, 20, 30 and 40 are employed for communication purposes, it is made possible to achieve a suppression of any adverse influence on the communication using the optical fibers at the time of separating the optical fiber ribbon into a single optical fiber.

In order to be able to achieve a sufficient reduction of any adverse influence on the communication using the optical fibers in the event of employing some of the optical fibers 10, 20, 30 and 40 for communication, in each of the optical fiber ribbons 1–6, it is preferred that an amount of the change in the loss at a wavelength of 1.55 µm at the time of performing a separation of a single optical fiber, is as small as 1.0 dB or less. Change in the transmission loss exceeding 1.0 dB caused at the time of seperating a single optical fiber currently in use for communicating signals from an optical fiber ribbon would lead to an instantaneous interruption of the communication via the optical fiber. In order to enable midspan accessing an active line portion without causing any instantaneous interruption, it is preferred that there is less than 155 µm the thickness of the optical fibers 10, 20, 30 and 40, wherein the thickness is to be determined in the thickness direction perpendicular to the plane of the juxtapositional arrangement pertaining to the plurality of optical fibers arranged in parallel in juxtaposition with each other and the adhesion force between the pigmented layers of the optical fibers 10, 20, 30 and 40 and the ribbon matrix is 0.4–5.0 g/cm respectively in 180° peel test. Also, it is preferred that, in a position between the two adjacent optical fibers as shown in FIG. 3A, FIG. 3B or FIG. 6, the thickness of the ribbon matrix is small. The peel test will be described later.

Also, in the glass section $10_A$ of the optical fiber 10, it is preferred that the transmission loss at a wavelength of 1.3 µm is 0.5 dB/km or less. The other optical fibers 20, 30 and 40 are the same as the above. In this case, the optical fiber ribbons 1–6 permit a long distance transmission.

Further, in the glass section $10_A$ of the optical fiber 10, the absolute value of the wavelength dispersion at a wavelength of 1.3 µm and at a wavelength of 1.55 µm respectively is within the above-described range. The other optical fibers 20, 30 and 40 are the same as the above. Consequently, each of the optical fiber ribbons 1–6 according to the respective Embodiments is capable of transmitting signal light in both wavebands of a wavelength of 1.3 µm and a wavelength of 1.55 µm.

Furthermore, in the glass section $10_A$ of the optical fiber 10, it is preferred that the mode field diameter defined by the definition of Petermann-I at a wavelength of 1.3 µm is 6 µm or more. In this case, in the glass section $10_A$ of the optical fiber 10, when fusion-bonded to a standard single mode optical fiber having zero-dispersion wavelength at a waveband of 1.3 µm wavelength, the connection loss is small. Also, when the optical fibers as described above are fusion-bonded to each other, the connection loss due to miss alignment between the axes is small. The other optical fibers 20, 30 and 40 are the same as the above respectively.

Still further, it is preferred that each of the optical fibers 10, 20, 30 and 40 has successfully passed the proof test of elongation strain 1.5% or more. In this case, the fracture probability, being bent to a bending diameter 30 mm and left for 20 years, is $1\times10^{-5}$/km or less. It is further preferred that each of the optical fibers 10, 20, 30 and 40 has successfully passed the proof test of elongation strain 2.5% or more. In this case, the fracture probability, being bent to a bending diameter 15 mm and left for 20 years, is $1\times10^{-5}$/km or less. Further, it is preferred that each of the optical fibers 10, 20, 30 and 40 has a fatigue coefficient of 50 or more. In this case, the fracture probability, being bent to a bending diameter 30 mm and left for 20 years, is $1\times10^{-5}$/km or less. In the above cases, in each of the optical fiber ribbons 1–6, even when bent to a small bending diameter, the reliability is ensured for long time.

Figure 13:
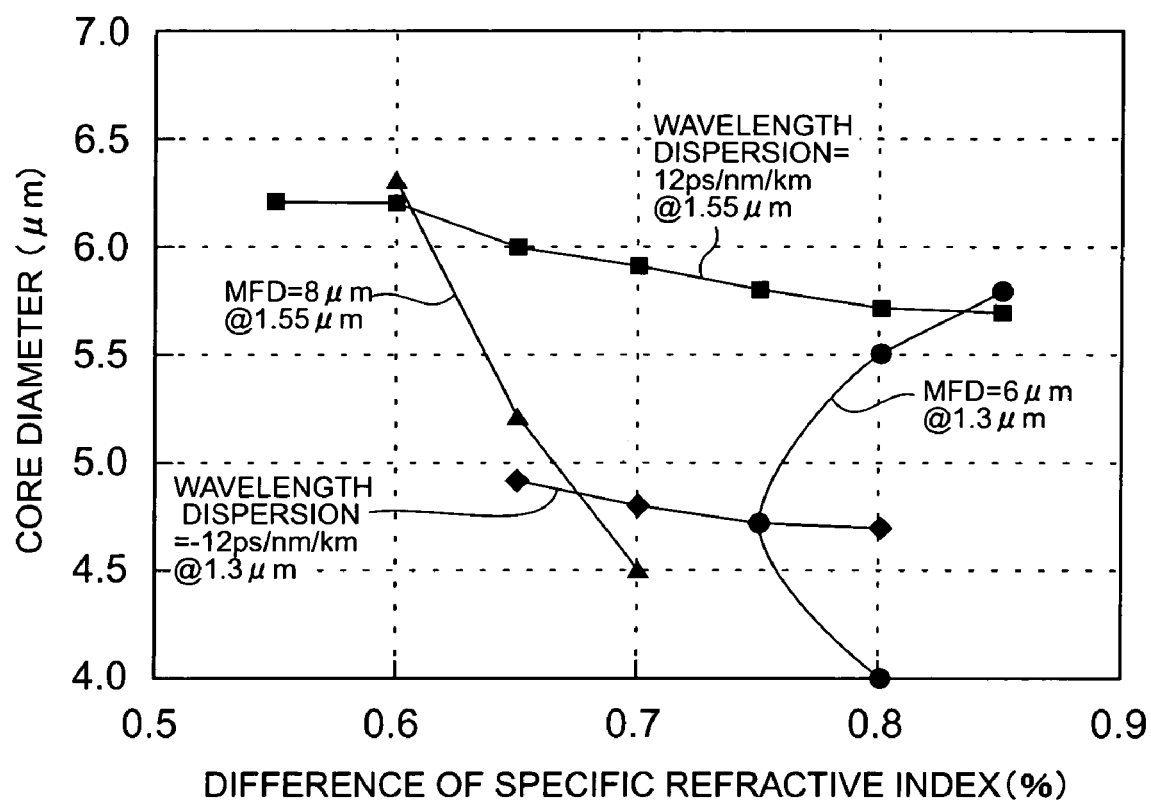
FIG. 13 is a graph showing a range suitable for difference of specific refractive index Δ and outer diameter 2a in a optical fiber portion 11 of the glass section $10_A$ of the optical fiber 10 having a step-like shape refractive index distribution.

FIG. 13 is a graph showing a suitable range of the difference in specific refractive index Δ and outer diameter 2a of the optical fiber portion 11 in the glass section $10_A$ of the optical fiber 10, which has a step-like shape refractive index distribution. In the graph, the abscissa represents the difference of specific refractive index Δ in the optical fiber portion 11 of the glass section $10_A$ in the optical fiber 10; the ordinate represents the outer diameter $2a$ of the optical fiber portion 11. The difference of specific refractive index Δ in the optical fiber portion 11 is represented based on the refractive index of the cladding area 12. In the graph, a line in which the wavelength dispersion at a wavelength of 1.3 μm is −12 ps/nm/km; a line in which the wavelength dispersion at a wavelength of 1.55 μm is +12 ps/nm/km; a line in which the mode field diameter defined by the definition of Petermann-I at a wavelength of 1.55 μm is 8 μm; a line in which the mode field diameter defined by the definition of Petermann-I at a wavelength of 1.3 μm is 6 μm are represented respectively. The area enclosed by these four lines is the suitable range.

Figure 14:
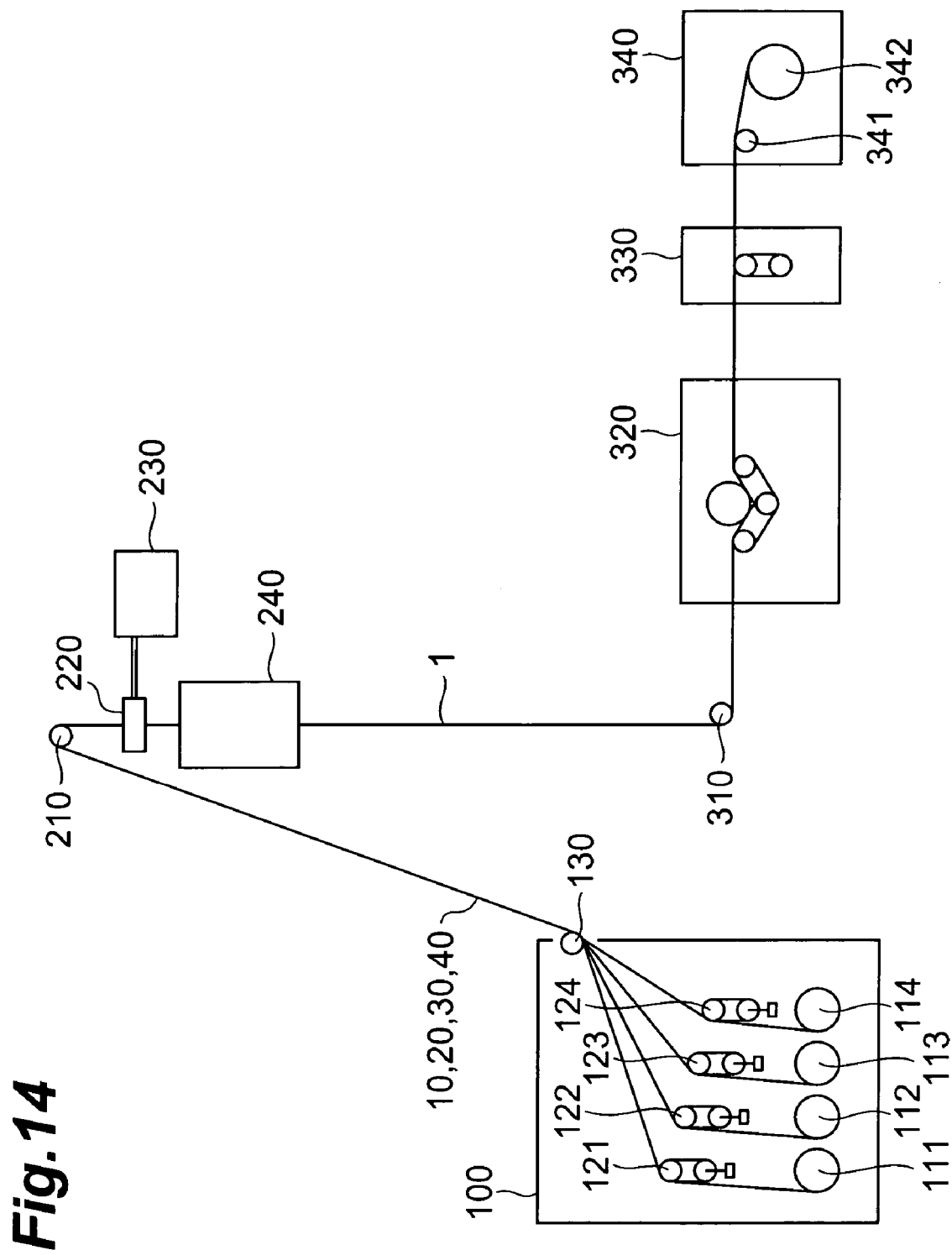
FIG. 14 is a schematic illustration of a manufacturing process of the optical fiber ribbon 1 according to an embodiment of the present invention.

Next, the manufacturing process of the optical fiber ribbon 1 according to the Embodiments of the present invention will be described. FIG. 14 is a schematic illustration of the manufacturing process of the optical fiber ribbon 1 according to the Embodiments. In a supply unit 100, reels 111–114, dancer roller 121–124 and guide roller 130 are provided. The optical fiber 10 is wound on the reel 111; the optical fiber 20 is wound on the reel 112; the optical fiber 30 is wound on the reel 113; the optical fiber 40 is wound on the reel 114. The optical fiber 10 is fed out from the reel 111, given with a tension of several dozen grams by the dancer roller 121, and is sent to a collector unit 210 via the guide roller 130. The optical fiber 20 is fed out from the reel 112, given with a tension of several dozen grams by the dancer roller 122, and is sent to a collector unit 210 via the guide roller 130. The optical fiber 30 is fed out from the reel 113, given with a tension of several dozen grams by the dancer roller 123, and is sent to a collector unit 210 via the guide roller 130. And, the optical fiber 40 is fed out from the reel 114, given with a tension of several dozen grams by the dancer roller 124, and is sent to a collector unit 210 via the guide roller 130.

Each of the four optical fibers 10, 20, 30 and 40 is sent to the collector unit 210 through a guide groove formed on the guide roller 130, and further sent to a coating unit 220. On arriving at the coating unit 220, the four optical fibers 10, 20, 30 and 40 are arranged in a plane being brought into contact with each other in parallel thereto, and a UV curable resin is applied to the periphery thereof by the coating unit 220. The UV curable resin is supplied from a pressurized resin tank 230. The coating unit is equipped with a die or a dispenser. When the optical fibers pass through the die filled with the ribbon matrix of the UV curable resin, the periphery thereof is applied with the ribbon matrix. Or, by extruding the ribbon matrix from the dispenser, the ribbon matrix may be applied to the surface of the running optical fibers. When the ribbon matrix is extruded from the dispenser intermittently, the ribbon matrix can be applied to the surface of the optical fibers intermittently. Then, the four optical fibers applied with the UV curable resin are irradiated with ultraviolet light by an ultraviolet radiation unit 240 to harden the UV curable resin. The hardened UV curable resin forms the ribbon matrix 51, thus the four-optical fiber optical fiber ribbon 1 is manufactured. The optical fiber ribbon 1 is further sent to a winding unit 340 through a guide roller 310, a feeder capstan 320 and a winding tension control dancer roller 330. In the winding unit 340, the optical fiber ribbon 1 is wounded onto a reel 342 through the guide roller 341. Here, the winding tension is set to several dozen grams to several hundred grams.

As for the ribbon matrix 51, for example, a tough resin from urethane acrylate of which Young's modulus is preferably approximately 200–1000 MPa (more preferably, 400–1000), and the fracture strength thereof is approximately 3.0–6.0 MPa is used. When the Young's modulus of the ribbon matrix 51 is smaller than 200 MPa (more preferably, 400 MPa), when a lateral pressure is given thereto, transmission loss is readily caused and the surface thereof readily melts. On the other hand, when the Young's modulus of the ribbon matrix 51 is larger than 1000 MPa, when the ribbon matrix 51 is hardened, the shrinkage stress becomes large and the transmission loss tends to increase. Further, if the fracture strength is smaller than 3.0 MPa, when a stress is given thereto, the optical fiber ribbon is readily broken; and accordingly resulting in a break of the optical fiber ribbon during manufacturing or laying down the cable. On the other hand, if the FRACTURE strength is larger than 6.0 MPa, since the ribbon matrix becomes too tough, a single optical fiber is hardly separated from the optical fiber ribbon.

Further, in order to prevent the pigmented layer of the respective optical fibers 10, 20, 30 and 40 from peeling off from the protective coating, it is preferred that the adhesion force between the pigmented layer and the ribbon matrix 51 of the respective optical fibers 10, 20, 30 and 40 is 0.4–5.0 g/cm in 180° peel test. If the adhesion force is smaller than 0.4 g/cm, in the case where the optical fiber ribbon is placed under a high temperature and high humidity condition, blisters are readily generated between the pigmented layer and the ribbon matrix resulting in an increase of loss. On the other hand, if the adhesion force is larger than 5.0 g/cm, since the adhesion between the pigmented layer and the ribbon matrix becomes too strong, a single optical fiber is hardly separated from the optical fiber ribbon, or, the pigmented layer tends to peel off from the optical fiber.

Next, specific examples of the optical fiber ribbon according to the Embodiments will be described. The optical fiber ribbon of the examples has four optical fibers. Each of the four optical fibers has the profile of refractive index shown in FIG. 10B. The glass section is comprised of a single mode optical fiber of 125 μm in cladding diameter, and on the periphery of the glass section, a coat layer of 250 or 255 μm in outer diameter, which includes the inner protective coating and the outer protective coating and the pigmented layer comprised a UV curable resin from urethane acrylate-series. As will be described later, in examples 1–12, the coat layer is 250 μm in outer diameter; in examples 13–25, the coat layer is 255 μm in outer diameter. The thickness of the inner protective coating is approximately 37 μm; the thickness of the outer protective coating is approximately 23 μm; and the thickness of the pigmented layer is approximately 5 μm. The Young's modulus of the inner protective coating is 0.1 kg/mm$^2$; and the Young's modulus of the inner protective coating is 85 kg/mm$^2$. The optical fiber ribbons were manufactured by the manufacturing process shown in FIG. 14. The winding tension of the optical fiber ribbons was 150 g.

The adhesion force between the pigmented layer and the ribbon matrix was controlled by adding a silicone additive to the ribbon matrix. As the ribbon matrix, a resin prepared based on urethane-acrylate oligomer, in which PTMG (polytetramethylene glycol), TDI (tolylene diisocyanate) and HEA (hydroxyethyl acrylate) are copolymerized, was used. As the dilution monomer of the resin for ribbon matrix, a resin added with N-vinyl pyrrolidone, ethyleneoxide-modified bisphenol-A diacrylate and Irgacurable 184 as a photoinitiator was used. The Young's modulus of the ribbon matrix was 80 kg/mm$^2$.

The peel test was conducted under the conditions as described below. A resin for forming the outer protective coating was applied approximately 20 μm in thickness on a PET (polyethylene terephthalate) substrate, and the resin was hardened by being exposed to the ultraviolet radiation of 100 mJ/cm² in irradiation light intensity, in the air, using a metal halide lamp. Over that resin, a resin for forming the pigmented layer was applied approximately 10 μm in thickness using a spin coater, and the resin was hardened being exposed to ultraviolet radiation of 75 mJ/cm² in irradiation light intensity in nitrogen. Further over the resin, a resin for forming the ribbon matrix was applied approximately 80 μm in thickness using a spin coater, and the resin was hardened by being exposed to the ultraviolet radiation of 100 mJ/cm² in irradiation light intensity in nitrogen. After that, the three-layered resin film, which was formed as described above, was left for 24 hours, at 23° C. and 50% RH. Then, the film was removed from the PET substrate, and a part of the pigmented layer and the ribbon matrix was peeled off to make a gripping margin. Using a tensile tester, the respective gripping margins of the pigmented layer and ribbon matrix were pulled in the directions opposite to each other at a tension speed of 200 m/min. This 180°-peel test was conducted at 23° C. and 50% RH. The width of the sample was 45 mm.

The separation of a single optical fiber was conducted as described below. A light source was connected to one end of the optical fibers (length: 10 m) respectively, and a photo receiver was connected to another end thereof. From the start to the completion of the work of a separation of a single optical fiber for an approximately 50 cm optical fiber ribbon at an midway portion thereof, light of a wavelength of 1.55 μm, which was output from the light source, was allowed to enter from the one end of the optical fibers, and the power of the light output from the another end thereof was detected by the photo receiver to monitor the changes of the transmission loss. For the separation of a single optical fiber, a separator jig TS-1/4 manufactured by Sumitomo Electric Industries, Ltd was used.

As for the examples 1–5, the separation of a single optical fiber was further conducted in accordance with the following method. A light source was connected to one end of the respective optical fibers (length 10 m), and a photo receiver was connected to another end. From the start to the completion of the work of a separation of a single optical fiber for an approximately 50 cm optical fiber ribbon at an midway portion thereof, light of a wavelength of 1.55 μm, which was output from the light source, was allowed to enter from the one end of the optical fibers, and the power of the light output from the another end thereof was detected by the photo receiver to monitor the changes of the transmission loss. When separating a single optical fiber, a resin film of a thickness of 0.1 mm is inserted between the optical fibers the portion of which was not covered with the ribbon matrix and moved along the optical fibers to shear the ribbon matrix.

With respect to the optical fiber ribbon according to the Embodiment 1, each of the optical fiber ribbons of examples 1–12 were manufactured and evaluated as described above. FIG. 15A is a chart in which the characteristics of the optical fiber ribbon of each example are summarized. In this chart, from the top in order, mode field diameter (MFD, unit: μm), defined by the definition of Petermann-I at a wavelength of 1.55 μm, cable cutoff wavelength (unit: μm), bending loss (unit: dB/turn) with bending diameter 15 mm at a wavelength of 1.55 μm, changes in the loss (unit: dB) at a wavelength of 1.55 μm when a separation of a single optical fiber is made, thickness of the ribbon matrix (unit: μm), adhesion force (unit: g/cm) between the pigmented layer and the ribbon matrix, existence of recessions in the surface of the ribbon matrix, elongation strain of the optical fiber at the proof test, fatigue coefficient, long term reliability, transmission loss at a wavelength of 1.3 μm (unit: dB/km), maximum value of absolute values of wavelength dispersion at a wavelength of 1.3–1.55 μm (unit: ps/nm/km), difference between the maximum value and the minimum value of the cladding diameter (unit: μm), and optical connector connection loss at a wavelength of 1.55 μm (unit: dB) are listed. In the transmission loss and wavelength dispersion respectively, between the case where the transmission loss of an optical fiber was measured and the case where the transmission loss after assembling into an optical fiber ribbon was measured, little difference was found. The optical fiber ribbons of the examples 1 and 2 fulfill the preferred range or every suitable requirement described above respectively. In the chart, the arrowhead oriented leftward indicates that the value is the same as the value written in the left column.

In the optical fiber ribbon of the example 1, the mode field diameter at a wavelength of 1.55 μm was 7.9 μm, the cable cutoff wavelength was 1.1 μm, the bending loss in a bending diameter of 15 mm at a wavelength of 1.55 μm was 0.02 dB/turn, the change in the loss at a wavelength 1.55 μm on the occasion of a separation of a single optical fiber was 0.7 dB, the thickness of the ribbon matrix was 145 μm, the adhesion force between the pigmented layer and the ribbon matrix was 4.9 g/cm, recessions are formed in the surface of the ribbon matrix (i.e., a structure shown in FIG. 3A), the elongation strain of the optical fibers at proof test was 1.5%, the fatigue coefficient was 110, fracture probability in 20 years with a bending diameter of 15 mm was $10^{-5}$/km or less, the transmission loss at a wavelength of 1.3 μm was 0.4 dB/km, the wavelength dispersion was 11 ps/nm/km, the difference between the maximum value and the minimum value of the cladding diameter was 0.9 μm, and the connector connection loss was 0.6 dB. In the example 1, the glass section of each optical fiber is carbon-covered. Consequently, the fatigue coefficient was determined as 110. Here, in the following examples 1–12, the length of the portions covered with the ribbon matrix is 250 mm, and the length of the portions uncovered therewith is 20 mm and both portions are arranged alternately.

As compared with the optical fiber ribbon of the example 1, the optical fiber ribbon of the example 2 is different therefrom in the following points; i.e., the mode field diameter is smaller as 6.9 μm; the bending loss with a bending diameter of 15 mm at a wavelength 1.55 μm is smaller as 0.01 dB/turn or less; and the change in the loss on the occasion of a separation of a single optical fiber at a wavelength of 1.55 μm is 0.5 dB.

As compared with the optical fiber ribbon of the example 1, the optical fiber ribbon of the example 3 is different therefrom in the following points; i.e., the thickness of the ribbon matrix is larger as 155 μm; and the change in the loss on the occasion of a separation of a single optical fiber at a wavelength of 1.55 μm is larger as 0.8 dB.

As compared with the optical fiber ribbon of the example 1, the optical fiber ribbon of the example 4 is different therefrom in the following points; i.e., the adhesion force between the pigmented layer and the ribbon matrix is smaller as 0.3 g/cm; and the change in the loss on the occasion of a separation of a single optical fiber at a wavelength of 1.55 μm is smaller as 0.6 dB. Also, in the optical fiber ribbon of the example 4, when placed for 30 days under a condition of 85° C. and 85% RH, the transmission loss was increased.

As compared with the optical fiber ribbon of the example 1, the optical fiber ribbon of the example 5 is different therefrom in the following points; i.e., the adhesion force between the pigmented layer and the ribbon matrix is larger as 5.1 g/cm; and the change in the loss on the occasion of a separation of a single optical fiber at a wavelength of 1.55 µm is larger as 0.9 dB. Also, in the case of the optical fiber ribbon of the example 5, when separating a single optical fiber, the pigmented layer was peeled off and the ribbon matrix was left. And further, in the optical fiber ribbon of the example 5, when placed for 30 days under a condition of 85° C. and 85% RH, the transmission loss was increased.

As compared with the optical fiber ribbon of the example 1, the optical fiber ribbon of the example 6 is different therefrom in the following points; i.e., the elongation strain of the optical fiber at proof test is smaller as 1.2%; the fatigue coefficient is smaller as 22; and the fracture probability with a bending diameter of 30 mm in 20 years is $5 \times 10^{-4}$/km or less.

As compared with the optical fiber ribbon of the example 1, the optical fiber ribbon of the example 7 is different therefrom in the following points; i.e., the elongation strain of the optical fiber at proof test is larger as 2.5%; and, the fatigue coefficient is smaller as 22.

As compared with the optical fiber ribbon of the example 1, the optical fiber ribbon of the example 8 is different therefrom in the following points; i.e., the fatigue coefficient is smaller as 22; and the fracture probability with a bending diameter of 30 mm in 20 years is $10^{-5}$/km or less.

As compared with the optical fiber ribbon of the example 1, the optical fiber ribbon of the example 9 is different therefrom in the following points; i.e., the fracture probability with a bending diameter of 30 mm in 20 years is $10^{-5}$/km or less; and the transmission loss at a wavelength of 1.3 µm is larger as 0.6 dB/km.

As compared with the optical fiber ribbon of the example 1, the optical fiber ribbon of the example 10 is different therefrom in the following points; i.e., the fracture probability with a bending diameter of 30 mm in 20 years is $10^{-5}$/km or less; and the wavelength dispersion is larger as 13 ps/nm/km.

As compared with the optical fiber ribbon of the example 1, the optical fiber ribbon of the example 11 is different therefrom in the following points; i.e., the fracture probability with a bending diameter of 30 mm in 20 years is $10^{-5}$/km or less; and the difference between the maximum value and the minimum value of the cladding diameter is larger as 1.1 µm, and the connector connecting loss is larger as 1.1 dB.

As compared with the optical fiber ribbon of the example 1, the optical fiber ribbon of the example 12 is different therefrom in the following points; i.e., the fracture probability with a bending diameter of 30 mm in 20 years is $10^{-5}$/km or less; the difference between the maximum value and the minimum value of the cladding diameter is smaller as 0.4 µm; and the connector connecting loss is smaller as 0.4 dB.

As demonstrated by comparing the characteristics of the optical fiber ribbons of the above examples 1–12, in any optical fiber ribbon, even when a separation of a single optical fiber is made in an midway portion, the increase of the loss is restricted to 0.9 dB or less. Particularly, in the optical fiber ribbon of the example 2 of which mode field diameter is small, the bending loss is the smallest, and also the increase of loss on the occasion of a separation of a single optical fiber is the smallest.

In any of the examples 1–12, it is possible to readily separate a single optical fiber from the optical fiber ribbon without using any special separating tools. In the Embodiment 1 through the Embodiment 6, the respective lengths of the first areas and second areas, and the thickness of the ribbon matrix may be determined within the above-described range depending on the circumstances under which the optical fiber ribbon is used. For example, in a case where a twist or bending is applied to the optical fiber ribbon, the Embodiment 1 may be selected and the first areas is longer, the length of the second areas is shorter and the thickness of the ribbon matrix is larger. In a case where a twist and bending applied to the optical fiber ribbon are small, and to carry out the separation of a single optical fiber easily, the Embodiment 6 may be selected.

Likewise, with respect to the Embodiment 7 and Embodiment 8, each of the optical fiber ribbons of the examples 13–25 were manufactured and evaluated. FIG. 15B is a chart in which the characteristics of the optical fiber ribbon of each example are summarized. In this chart, from the top in order, mode field diameter (MFD, unit: µm), defined by the definition of Petermann-I at a wavelength of 1.55 µm, cable cutoff wavelength (unit: µm), bending loss (unit: dB/turn) in bending diameter 15 mm at a wavelength of 1.55 µm, changes in the loss (unit: dB) at a wavelength of 1.55 µm on the occasion of a separation of a single optical fiber, thickness of the ribbon matrix (unit: µm), adhesion force (unit: g/cm) between the pigmented layer and the ribbon matrix, existence of recessions in the surface of the ribbon matrix, elongation strain of the optical fiber at the proof test, fatigue coefficient, long term reliability, transmission loss at a wavelength of 1.3 µm (unit: dB/km), maximum value of absolute values of wavelength dispersion at a wavelength of 1.3–1.55 µm (unit: ps/nm/km), difference between the maximum value and the minimum value of the cladding diameter (unit: µm), and optical connector connection loss at a wavelength of 1.55 µm (unit: dB) are listed. In the transmission loss and wavelength dispersion respectively, between the case where the transmission loss of an optical fiber was measured and the case where the transmission loss after assembling into an optical fiber ribbon was measured, little difference was found. The optical fiber ribbons of the examples 13 and 14 fulfill the preferred range or every suitable requirement described above respectively. In the chart, the arrowhead oriented leftward indicates that the value is the same as the value written in the left column.

In the optical fiber ribbon of the example 13, the mode field diameter at a wavelength of 1.55 µm was 7.9 µm, the cable cutoff wavelength was 1.1 µm, the bending loss with a bending diameter of 15 mm at a wavelength of 1.55 µm was 0.02 dB/turn, the change in the loss at a wavelength 1.55 µm on the occasion of a separation of a single optical fiber was 0.7 dB, the thickness of the ribbon matrix was 145 µm, the adhesion force between the pigmented layer and the ribbon matrix was 4.9 g/cm, recessions are formed in the surface of the ribbon matrix (i.e., a structure shown in FIG. 3B), the elongation strain of the optical fibers at proof test was 1.5 %, the fatigue coefficient was 110, the fracture probability in 20 years with a bending diameter of 15 mm was $10^{-5}$/km or less, the transmission loss at a wavelength of 1.3 µm was 0.4 dB/km, the wavelength dispersion was 11 ps/nm/km, the difference between the maximum value and the minimum value of the cladding diameter was 0.9 µm, and the connector connection loss was 0.6 dB. In the example, the glass section of each optical fiber is carbon-coated. Consequently, the fatigue coefficient was determined as 110.

As compared with the optical fiber ribbon of the example 13, the optical fiber ribbon of the example 14 is different therefrom in the following points; i.e., the mode field diameter is smaller as 6.9 µm; the bending loss with a bending diameter of 15 mm at a wavelength of 1.55 µm is smaller as 0.01 dB/turn or less, and the change in the loss on the occasion of a separation of a single optical fiber at a wavelength of 1.55 μm is 0.5 dB.

As compared with the optical fiber ribbon of the example 13, the optical fiber ribbon of the example 15 is different therefrom in the following points; i.e., the thickness of the ribbon matrix is larger as 155 μm; and the change in the loss on the occasion of a separation of a single optical fiber at a wavelength of 1.55 μm is larger as 0.8 dB.

As compared with the optical fiber ribbon of the example 13, the optical fiber ribbon of the example 16 is different therefrom in the following points; i.e., the adhesion force between the pigmented layer and the ribbon matrix is smaller as 0.3 g/cm; and the change in the loss on the occasion of a separation of a single optical fiber at a wavelength of 1.55 μm is smaller as 0.6 dB. And further, in the optical fiber ribbon of the example 16, when placed for 30 days under a condition of 85° C. and 85% RH, the transmission loss was increased.

As compared with the optical fiber ribbon of the example 13, the optical fiber ribbon of the example 17 is different therefrom in the following points; i.e., the adhesion force between the pigmented layer and the ribbon matrix is larger as 5.1 g/cm; and the change in the loss on the occasion of a separation of a single optical fiber at a wavelength of 1.55 μm is larger as 0.9 dB. Also, in the case of the optical fiber ribbon of the example 17, when separating a single optical fiber, the pigmented layer was peeled off and the ribbon matrix was left.

As compared with the optical fiber ribbon of the example 13, the optical fiber ribbon of the example 18 is different therefrom in the following points; i.e., no recession is formed in the surface of the ribbon matrix; and the change in the loss on the occasion of a separation of a single optical fiber at a wavelength of 1.55 μm is larger as 0.8 dB.

As compared with the optical fiber ribbon of the example 13, the optical fiber ribbon of the example 19 is different therefrom in the following points; i.e., the elongation strain of the optical fiber at proof test is smaller as 1.2%; the fatigue coefficient is smaller as 22; and the fracture probability with a bending diameter of 30 mm in 20 years is $5 \times 10^{-4}$/km or less.

As compared with the optical fiber ribbon of the example 13, the optical fiber ribbon of the example 20 is different therefrom in the following points; i.e., the elongation strain of the optical fiber at proof test is larger as 2.5%; and the fatigue coefficient is smaller as 22.

As compared with the optical fiber ribbon of the example 13, the optical fiber ribbon of the example 21 is different therefrom in the following points; i.e., the fatigue coefficient is smaller as 22; and the fracture probability with a bending diameter of 30 mm in 20 years is $10^{-5}$/km or less.

As compared with the optical fiber ribbon of the example 13, the optical fiber ribbon of the example 22 is different therefrom in the following points; i.e., the fracture probability with a bending diameter of 30 mm in 20 years is $10^{-5}$/km or less; and the transmission loss at wavelength of 1.3 μm is larger as 0.6 dB/km.

As compared with the optical fiber ribbon of the example 13, the optical fiber ribbon of the example 23 is different therefrom in the following points; i.e., the fracture probability with a bending diameter of 30 mm in 20 years is $10^{-5}$/km or less; and the wavelength dispersion is larger as 13 ps/nm/km.

As compared with the optical fiber ribbon of the example 13, the optical fiber ribbon of the example 24 is different therefrom in the following points; i.e., the fracture probability with a bending diameter of 30 mm in 20 years is $10^{-5}$/km or less; the difference between the maximum value and the minimum value of the cladding diameter is larger as 1.1 μm; and the optical connector connecting loss is larger as 1.1 dB.

As compared with the optical fiber ribbon of the example 13, the optical fiber ribbon of the example 25 is different therefrom in the following points; i.e., the fracture probability with a bending diameter of 30 mm in 20 years is $10^{-5}$/km or less; the difference between the maximum value and the minimum value of the cladding diameter is smaller as 0.4 μm; and the optical connector connecting loss is smaller as 0.4 dB.

As demonstrated by comparing the characteristics of the optical fiber ribbons of the above examples 13–25, in the Embodiments 7 and 8 where entire periphery in full lenght of optical fibers are covered, in any optical fiber ribbon, even when a separation of a single optical fiber is performed in an midway portion, the increase of the loss is reduced to 0.9 dB or less. Particularly, in the optical fiber ribbon of the example 14 where mode field diameter is small, the bending loss is the smallest, and also the increase of loss on the occasion of a separation of a single optical fiber is the smallest.

INDUSTRIAL APPLICABILITY

As described above in detail, the optical fiber ribbon according to the present invention is excellent in bending property, and thereby it is possible to prevent the loss from increasing even when a separation of a single optical fiber is performed in a midway portion thereof.

The invention claimed is:

1. An optical fiber ribbon comprising a plurality of optical fibers that are arranged parallel to each other on a disposition plane and are covered with a ribbon matrix:
   wherein:
   in each of said optical fibers, the mode field diameter defined by the definition of Petermann-1 at a wavelength of 1.55 μm is 8 μm or less, and the cable cutoff wavelength is 1.26 μm or less;
   in each of said optical fibers, the bending loss in case of a bending diameter of 15 mm at a wavelength of 1.55 μm is 0.1 dB/turn or less;
   the absolute value of the wavelength dispersion in each of said optical fibers each at a wavelength of 1.3 μm and at a wavelength of 1.55 μm is 12 ps/nm/km or less;
   when separating one of said optical fibers from said optical fiber ribbon at a midway position in the longitudinal direction of said optical fiber ribbon, increase in an amount of the transmission loss of this optical fiber at a wavelength of 1.55 μm is 1.0 dB or less;
   the thickness of each of said optical fibers in the direction perpendicular to said disposition plane is less than 155 μm; and
   each of said optical fibers is covered with a pigmented layer, and adhesion force between said pigmented layer and said ribbon matrix in a 180° peel test is 0.4–5.0 g/cm.

2. The optical fiber ribbon according to claim 1, wherein in each of said optical fibers, the bending loss in case of a bending diameter of 15 mm at a wavelength of 1.55 μm is 0.02 dB/turn or less.

3. The optical fiber ribbon according to claim 1 or 2, wherein a protective coating of each of said optical fibers is comprised of a single layer, and the Young's modulus of each of said protective coatings is 10 kg/mm² or more.

4. The optical fiber ribbon according to claim 1, wherein the thickness of said optical fiber ribbon in the direction perpendicular to said disposition plane is smaller at a position between a pair of said optical fibers adjacent to each other than at the center of said optical fibers.

5. The optical fiber ribbon according to claim 1, wherein in each of said optical fibers the cable cutoff wavelength is 1.00 μm or more.

6. The optical fiber ribbon according to claim 1, wherein the transmission loss of each of said optical fibers at a wavelength of 1.3 μm is 0.5 dB/km or less.

7. The optical fiber ribbon according to claim 1, wherein each of said optical fibers has passed successfully in a proof test of stretch and distortion of 1.5% or more.

8. The optical fiber ribbon according to claim 1, wherein each of said plurality of optical fibers has passed successfully in a proof test of stretch and distortion of 2.5% or more.

9. The optical fiber ribbon according to claim 1, wherein the fatigue coefficient of each of said optical fibers is 50 or more.

10. The optical fiber ribbon according to claim 1, wherein the difference between the maximum value and the minimum value in a cladding diameter of said optical fibers is 1.0 μm or less.

11. The optical fiber ribbon according to claim 1, wherein the thickness of a protective coating of each of said optical fibers is 15–37.5 μm.

12. The optical fiber ribbon according to claim 1, wherein a protective coating of each of said optical fibers is comprised of a single layer.

13. The optical fiber ribbon according to claim 1, wherein a protective coating of each of said optical fibers is comprised of double layers, the thickness of said protective coating is 15–37.5 μm, the Young's modulus of an inner protective coating is 0.2 kg/mm$^2$ or less, and the Young's modulus of an outer protective coating is 10 kg/mm$^2$ or more.

14. The optical fiber ribbon according to claim 1, wherein when separating one of said optical fibers from said optical fiber ribbon at a midway position in the longitudinal direction of said optical fiber ribbon, increase in an amount of the transmission loss of this optical fiber at a wavelength of 1.55 μm is 0.9 dB or less.

* * * * *